(12) United States Patent
Cheng et al.

(10) Patent No.: US 11,811,251 B2
(45) Date of Patent: Nov. 7, 2023

(54) ON-BOARD DISTRIBUTED POWER SUPPLY SYSTEM AND ONBOARD POWER SUPPLY CONTROL METHOD AND APPARATUS

(71) Applicant: HUAWEI DIGITAL POWER TECHNOLOGIES CO., LTD., Shenzhen (CN)

(72) Inventors: Yang Cheng, Xi'an (CN); Xueliang Zhang, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/585,006

(22) Filed: Jan. 26, 2022

(65) Prior Publication Data

US 2022/0209553 A1 Jun. 30, 2022

(30) Foreign Application Priority Data

Jan. 28, 2021 (CN) .......................... 202110116508.8

(51) Int. Cl.
*B60L 50/64* (2019.01)
*B60L 53/62* (2019.01)
(Continued)

(52) U.S. Cl.
CPC ............ *H02J 7/0031* (2013.01); *B60L 50/64* (2019.02); *B60L 53/62* (2019.02); *B60L 53/63* (2019.02);
(Continued)

(58) Field of Classification Search
CPC ...... H02J 7/0031; H02J 7/0013; H02J 7/0048; H02J 7/0063; H02J 2207/20; B60L 50/64;
(Continued)

(56) References Cited

U.S. PATENT DOCUMENTS 6,177,779 B1 1/2001 Eguchi
7,208,894 B1 4/2007 Earle
(Continued)

FOREIGN PATENT DOCUMENTS

CN 102029883 A 4/2011
CN 203844623 U 9/2014
(Continued)

OTHER PUBLICATIONS

Extended European Search Report issued in corresponding European Application No. 22151301.3, dated Jun. 21, 2022, pp. 1-8.
(Continued)

*Primary Examiner* — Lincoln D Donovan
*Assistant Examiner* — Alex W Lam
(74) *Attorney, Agent, or Firm* — HUAWEI TECHNOLOGIES CO., LTD.

(57) ABSTRACT

An on-board distributed power supply system is coupled to an on-board distributed drive system. The on-board distributed drive system includes at least two power trains, and the on-board distributed power supply system includes at least two low-voltage battery pack groups. Each low-voltage battery pack group of the at least two low-voltage battery pack groups includes at least one low-voltage battery pack. Each low-voltage battery pack of the at least one low-voltage battery pack includes a plurality of battery cells. Each low-voltage battery pack group of the at least two low-voltage battery pack groups is correspondingly electrically connected to at least one of the power trains in the on-board distributed drive system, and is configured to provide electric energy for each power train of the at least two power trains in the on-board distributed drive system.

14 Claims, 26 Drawing Sheets

(51) Int. Cl.
*B60L 58/21* (2019.01)
*B60L 53/63* (2019.01)
*H02J 7/00* (2006.01)
*H01M 50/51* (2021.01)
*H01M 10/42* (2006.01)

(52) U.S. Cl.
CPC ........... *B60L 58/21* (2019.02); *H01M 10/425* (2013.01); *H01M 10/4207* (2013.01); *H01M 50/51* (2021.01); *H02J 7/0013* (2013.01); *H02J 7/0048* (2020.01); *H02J 7/0063* (2013.01); *B60L 2210/10* (2013.01); *H01M 2010/4271* (2013.01); *H01M 2220/20* (2013.01); *H02J 2207/20* (2020.01)

(58) Field of Classification Search
CPC ...... B60L 53/62; B60L 58/21; B60L 2210/10; B60L 2220/42; B60L 2220/46; B60L 2240/54; B60L 2260/28; B60L 3/0046; B60L 3/0092; B60L 3/04; B60L 15/32; B60L 50/66; B60L 58/13; B60L 58/18; B60L 58/22; B60L 1/10; B60L 1/02; H01M 10/4207; H01M 10/425; H01M 50/51; H01M 2010/4271; H01M 2220/20; Y02T 10/64; Y02T 10/7072; Y02T 10/72; Y02T 90/12
See application file for complete search history.

(56) References Cited

U.S. PATENT DOCUMENTS

| | | | |
|---|---|---|---|
| 2005/0017682 A1* | 1/2005 | Canter | H02J 7/0016 320/118 |
| 2009/0078481 A1 | 3/2009 | Harris | |
| 2012/0261982 A1* | 10/2012 | Wanke | B60L 1/006 307/9.1 |
| 2013/0002016 A1* | 1/2013 | Furukawa | B60L 58/12 307/43 |
| 2016/0126588 A1 | 5/2016 | Despesse | |
| 2018/0272883 A1* | 9/2018 | Schmidt | H02J 7/00308 |
| 2020/0235440 A1* | 7/2020 | Hao | H01M 10/425 |

FOREIGN PATENT DOCUMENTS

| | | |
|---|---|---|
| CN | 104228602 A | 12/2014 |
| CN | 107681757 A | 2/2018 |
| CN | 107696863 A | 2/2018 |
| CN | 108284725 A | 7/2018 |
| CN | 207725243 U | 8/2018 |
| CN | 109484246 A | 3/2019 |
| CN | 110549911 A | 12/2019 |
| CN | 110588366 A | 12/2019 |
| CN | 111094052 A | 5/2020 |
| CN | 112172547 A | 1/2021 |
| EP | 3011630 B1 | 8/2017 |
| EP | 2681782 B1 | 12/2017 |

OTHER PUBLICATIONS

International Search Report issued in corresponding International Application No. PCT/CN2021/135424, dated Mar. 1, 2022, pp. 1-5.
Qiu Taijun, "Circuit Analysis Basics and Practice", published by Southwest Jiaotong University in 2013, with an English abstract, total 7 pages.

\* cited by examiner

TO

TO

TO

TO

ON-BOARD DISTRIBUTED POWER SUPPLY SYSTEM AND ONBOARD POWER SUPPLY CONTROL METHOD AND APPARATUS

CROSS-REFERENCE TO RELATED APPLICATIONS

This application claims priority to Chinese Patent Application No. 202110116508.8, filed on Jan. 28, 2021, which is hereby incorporated by reference in its entirety.

TECHNICAL FIELD

This application relates to the field of electric vehicle technologies, and in particular, to an on-board distributed power supply system and an on-board power supply control method and apparatus.

BACKGROUND

Currently, on-board centralized drive systems are widely used as drive systems of electric vehicles, but the on-board centralized drive system has a monotonous power source. Generally, the on-board centralized drive systems are classified into single-motor drive systems and dual-motor drive systems. In the single-motor drive system, only one power train is disposed, and the power train is connected to two front wheels (or two rear wheels) to drive the two front wheels (or the two rear wheels) to roll, so as to drive the electric vehicle to travel. In the dual-motor drive system, two power trains are disposed, where one power train is connected to two front wheels to drive the two front wheels to roll, and the other power train is connected to two rear wheels to drive the two rear wheels to roll, so as to drive the electric vehicle to travel. The power train is configured to drive the wheel to roll, and may include components such as a motor, a reducer, and a differential.

Correspondingly, a centralized power supply architecture is also used in a vehicle power supply system. The centralized power supply architecture includes only one high-voltage battery pack, and power is supplied to a component such as the power train in the drive system by using the high-voltage battery pack.

With continuous development of electric vehicle related technologies, to improve drive efficiency, operation stability, control flexibility, and the like of the drive system, the drive system of the electric vehicle is evolving from a centralized drive system to a distributed drive system. An on-board distributed drive system includes at least two power trains. The front left wheel and the front right wheel (or the back left wheel and the back right wheel) are connected to different power trains, namely, the front left wheel and the front right wheel (or the back left wheel and the back right wheel) are respectively driven by using the two power trains.

However, the centralized power supply architecture is still used in a current distributed drive system. Although a centralized drive technology is mature and has a simple solution, centralized drive has low efficiency and system safety, and poor operation stability and power supply reliability, and cannot meet a safety requirement in future intelligent driving.

SUMMARY

This application provides an on-board distributed power supply system and an on-board power supply control method and apparatus, to improve power supply reliability and safety of the power supply system.

According to a first aspect, this application provides an on-board distributed power supply system, applied to an on-board distributed drive system. The on-board distributed drive system may be applied to various electric vehicles, or may be applied to another vehicle that needs to be driven by a motor. This is not limited herein. The on-board distributed drive system includes at least two power trains. The power train is connected to a wheel, and is configured to drive the wheel to roll. The on-board distributed power supply system in this embodiment of this application may include at least two low-voltage battery pack groups. Each low-voltage battery pack group includes at least one low-voltage battery pack, and each low-voltage battery pack includes a plurality of battery cells. Each low-voltage battery pack group is correspondingly electrically connected to at least one of the power trains in the on-board distributed drive system to provide electric energy for each power train in the on-board distributed drive system.

In this embodiment of this application, power is supplied to the power train in the on-board distributed drive system by using at least two low-voltage battery pack groups. When a low-voltage battery pack in any low-voltage battery pack group is faulty, remaining low-voltage battery pack groups may continue to work. Therefore, this can avoid a failure of the entire power supply system and improve power supply reliability and safety of the power supply system.

In a possible implementation, the low-voltage battery pack group includes one low-voltage battery pack or at least two low-voltage battery packs connected in series. In an actual application process, a quantity of low-voltage battery packs in the low-voltage battery pack group may be set based on a required rated voltage of the low-voltage battery pack group.

To provide electric energy for the on-board distributed drive system, the low-voltage battery pack groups in this embodiment of this application may be disposed in the following manners.

Manner 1: The low-voltage battery pack groups in the on-board distributed power supply system are electrically connected to the power trains in the on-board distributed drive system in a one-to-one correspondence manner.

Manner 2: Each low-voltage battery pack group in the on-board distributed power supply system is electrically connected to at least two power trains connected in parallel.

In a possible implementation, the on-board distributed power supply system may further include a high-voltage direct current bus. At least some low-voltage battery packs in the at least two low-voltage battery pack groups are connected in series, and are electrically connected to a high-voltage component in a vehicle by using the high-voltage direct current bus. The high-voltage direct current bus may be used as a channel for transmitting high-voltage electric energy, to provide electric power of each low-voltage battery pack for the high-voltage component. The high-voltage component may be a component such as an air conditioner. In actual application, a quantity of low-voltage battery packs connected in series may be set based on an electricity quantity requirement of the high-voltage component.

In a possible implementation, the on-board distributed power supply system may further include at least two direct current to direct current converters and a low-voltage bus. The direct current to direct current converters are connected in parallel, and are electrically connected to the high-voltage direct current bus. The direct current to direct current converter is electrically connected to a low-voltage component in the vehicle through the low-voltage bus. The direct current to direct current converter may convert a voltage of the high-voltage direct current bus into a low-voltage direct current power, to provide electric energy for the low-voltage component. The low-voltage bus is a channel for transmitting low-voltage electric energy, to provide, for the low-voltage component, the low-voltage direct current power that is output by the direct current to direct current converter.

In a possible implementation, the on-board distributed power supply system may further include at least two low-voltage batteries, where the low-voltage battery is electrically connected to the direct current to direct current converter. The direct current to direct current converter may supply power to the low-voltage battery, and the low-voltage battery may store low-voltage electric energy. In addition, the low-voltage battery is electrically connected to the low-voltage component through the low-voltage bus. Therefore, the low-voltage battery may supply power to the low-voltage component.

In a possible implementation, the on-board distributed power supply system may further include a plurality of switches. The switches each may include a contact blade, a first contact, and a second contact. A first electrode of each low-voltage battery pack is electrically connected to a second contact of one of the switches, and a second electrode is electrically connected to a second contact of another of the switches, and first contacts of the two switches connected to each low-voltage battery pack are electrically connected. In two adjacent low-voltage battery packs that are connected to each other, a contact blade of a switch connected to a first electrode of one of the low-voltage battery packs is electrically connected to a contact blade of a switch connected to a second electrode of the other of the low-voltage battery packs. In this embodiment of this application, the low-voltage battery packs are connected in series by using the switches, and a connection status of each low-voltage battery pack may be adjusted by controlling each switch.

In a possible implementation, the on-board distributed power supply system may further include control switches. The low-voltage battery pack groups are electrically connected to corresponding power trains by using the control switches. The control switches are disposed, so that the low-voltage battery pack groups and the corresponding power trains can be controlled to be connected or disconnected.

According to a second aspect, this application further provides an on-board power supply control method, used to control an on-board distributed power supply system. The on-board distributed power supply system includes at least two low-voltage battery pack groups and a high-voltage direct current bus. Each low-voltage battery pack group includes at least one low-voltage battery pack. Each low-voltage battery pack group is correspondingly electrically connected to at least one power train in an on-board distributed drive system to provide electric energy for each power train in the on-board distributed drive system. At least two of the low-voltage battery packs are connected in series, and are electrically connected to a high-voltage component in a vehicle by using the high-voltage direct current bus.

The on-board power supply control method includes: detecting a working status of each low-voltage battery pack electrically connected to the high-voltage direct current bus; and when determining, based on the working status, that any low-voltage battery pack electrically connected to the high-voltage direct current bus is faulty, disconnecting the faulty low-voltage battery pack from other low-voltage battery packs, and connecting the low-voltage battery packs other than the faulty low-voltage battery pack in series. In the on-board power supply control method in this embodiment of this application, a faulty low-voltage battery pack may be isolated, so that normal low-voltage battery packs can continue to supply power. This further improves power supply reliability and safety of the on-board distributed power supply system, to meet a power supply requirement and a safety requirement in future intelligent driving.

In a possible implementation, the on-board distributed power supply system further includes a plurality of switches. The switches each may include a contact blade, a first contact, and a second contact. A first electrode of each low-voltage battery pack is electrically connected to a second contact of one of the switches, and a second electrode is electrically connected to a second contact of another of the switches, and first contacts of the two switches connected to each low-voltage battery pack are electrically connected. In two adjacent low-voltage battery packs that are connected to each other, a contact blade of a switch connected to a first electrode of one of the low-voltage battery packs is electrically connected to a contact blade of a switch connected to a second electrode of the other of the low-voltage battery packs.

In the on-board power supply control method, the disconnecting the faulty low-voltage battery pack from other low-voltage battery packs, and connecting the low-voltage battery packs other than the faulty low-voltage battery pack in series may include: switching, to first contacts, contact blades of switches electrically connected to the faulty low-voltage battery pack; and switching, to second contacts, contact blades of switches connected to the low-voltage battery packs other than the faulty low-voltage battery pack. In this way, the faulty low-voltage battery pack may be disconnected from the other battery packs, and the normal low-voltage battery packs are connected in series. Therefore, the faulty low-voltage battery pack is isolated, and the normal low-voltage battery packs continue to supply power.

In a possible implementation, the on-board distributed power supply system may include at least three power trains, one of the power trains is connected to a front left wheel of the vehicle, another of the power trains is connected to a front right wheel of the vehicle, and remaining at least one of the power trains is connected to a back left wheel and a back right wheel of the vehicle. The on-board power supply control method may further include: when a low-voltage battery pack group electrically connected to the power train corresponding to the front left wheel of the vehicle and/or the power train corresponding to the front right wheel of the vehicle is faulty, disconnecting the power trains corresponding to the front left wheel and the front right wheel from the low-voltage battery pack group. In this way, it can be ensured that power supply of the electric vehicle is more balanced, and an abnormal phenomenon such as instability is prevented from occurring in the electric vehicle.

In a possible implementation, the on-board distributed power supply system includes at least three power trains, one of the power trains is connected to a back left wheel of the vehicle, another of the power trains is connected to a back right wheel of the vehicle, and remaining at least one of the power trains is connected to a front left wheel and a front right wheel of the vehicle. The on-board power supply control method further includes: when a low-voltage battery pack group electrically connected to the power train corresponding to the back left wheel of the vehicle and/or the power train corresponding to the back right wheel of the vehicle is faulty, disconnecting the power trains corresponding to the back left wheel and the back right wheel from the low-voltage battery pack group. In this way, it can be ensured that power supply of the electric vehicle is more balanced, and an abnormal phenomenon such as instability is prevented from occurring in the electric vehicle.

In a possible implementation, the on-board power supply control method in this embodiment of this application may further include: controlling the at least two low-voltage battery pack groups to be charged in series, and obtaining a remaining capacity of each low-voltage battery pack; when determining that there is a first low-voltage battery pack whose remaining capacity reaches a specified threshold in the at least two low-voltage battery pack groups, disconnecting the first low-voltage battery pack from low-voltage battery packs other than the first low-voltage battery pack; and controlling the low-voltage battery packs other than the first low-voltage battery pack to be charged in series. In this embodiment of this application, a charging process of each low-voltage battery pack is monitored, and a connection status of each low-voltage battery pack is adjusted, so that each low-voltage battery pack can be normally charged.

In a possible implementation, the on-board distributed power supply system may further include at least two direct current to direct current converters and a low-voltage bus. The direct current to direct current converters are connected in parallel, and are electrically connected to the high-voltage direct current bus. The direct current to direct current converter is electrically connected to a low-voltage component in the vehicle through the low-voltage bus.

The on-board power supply control method further includes: controlling the direct current to direct current converters to work simultaneously, and when determining that a first direct current to direct current converter in the at least two direct current to direct current converters is faulty, increasing output power of direct current to direct current converters other than the first direct current to direct current converter; or controlling one direct current to direct current converter in the at least two direct current to direct current converters to work, and controlling remaining direct current to direct current converters to be in a standby state; and when determining that the direct current to direct current converter in a working state is faulty, controlling one of the direct current to direct current converters other than the faulty direct current to direct current converter to output power. In this way, it can be ensured that electric energy is continuously supplied to the low-voltage component, to prevent the electric vehicle from being out of control or incapable of traveling because electric energy fails to be supplied to the low-voltage component. This improves power supply reliability of the low-voltage component.

According to a third aspect, this application further provides an on-board power supply control apparatus. The on-board power supply control apparatus is configured to perform any one of the on-board power supply control methods. The on-board power supply control apparatus may be a vehicle control unit or a battery management system. In addition, the on-board power supply control apparatus may be a control module or a control unit in the vehicle control unit (or the battery management system), and a specific type of the on-board power supply control apparatus is not limited herein.

REFERENCE NUMERALS

10: low-voltage battery pack group; 11: low-voltage battery pack; 111: housing; 112: battery cell; T1: first electrode; T2: second electrode; 12: high-voltage direct current bus; 13: direct current to direct current converter; 14: low-voltage bus; 15: low-voltage battery; 16: on-board charger; 17: switch; G: contact blade; S: first contact; D: second contact; 18: control switch; 21: power train; 211: motor control unit; 212: motor; 213: reducer; 22: high-voltage component; 23: low-voltage component; Q1: direct current charging interface; Q2: alternating current charging interface; FL: front left wheel; FR: front right wheel; BL: back left wheel; BR: back right wheel.

DESCRIPTION OF EMBODIMENTS

An on-board distributed power supply system provided in the embodiments of this application is applied to an on-board distributed drive system. The on-board distributed drive system may be applied to various electric vehicles, or may be applied to another vehicle that needs to be driven by a motor. This is not limited herein. The on-board distributed drive system includes at least two power trains. The power train is connected to a wheel, and is configured to drive the wheel to roll. Generally, the power train may include components such as a motor control unit (MCU), a motor, and a reducer. The power train may be a centralized power train, or may be of another type. For example, the power train may be a wheel-hub motor power train or a wheel-side motor power train. A type of the power train is not limited herein. For the wheel-hub motor power train, a motor and a reducer are directly disposed in a wheel rim, and transmission components such as a driver shaft, a universal joint, a differential, and a transmission are cancelled. For the wheel-side motor power train, a motor is disposed on a subframe. With reference to the accompanying drawings, the following describes several structures of the on-board distributed drive system by using an electric vehicle having four wheels as an example.

Figure 1A:
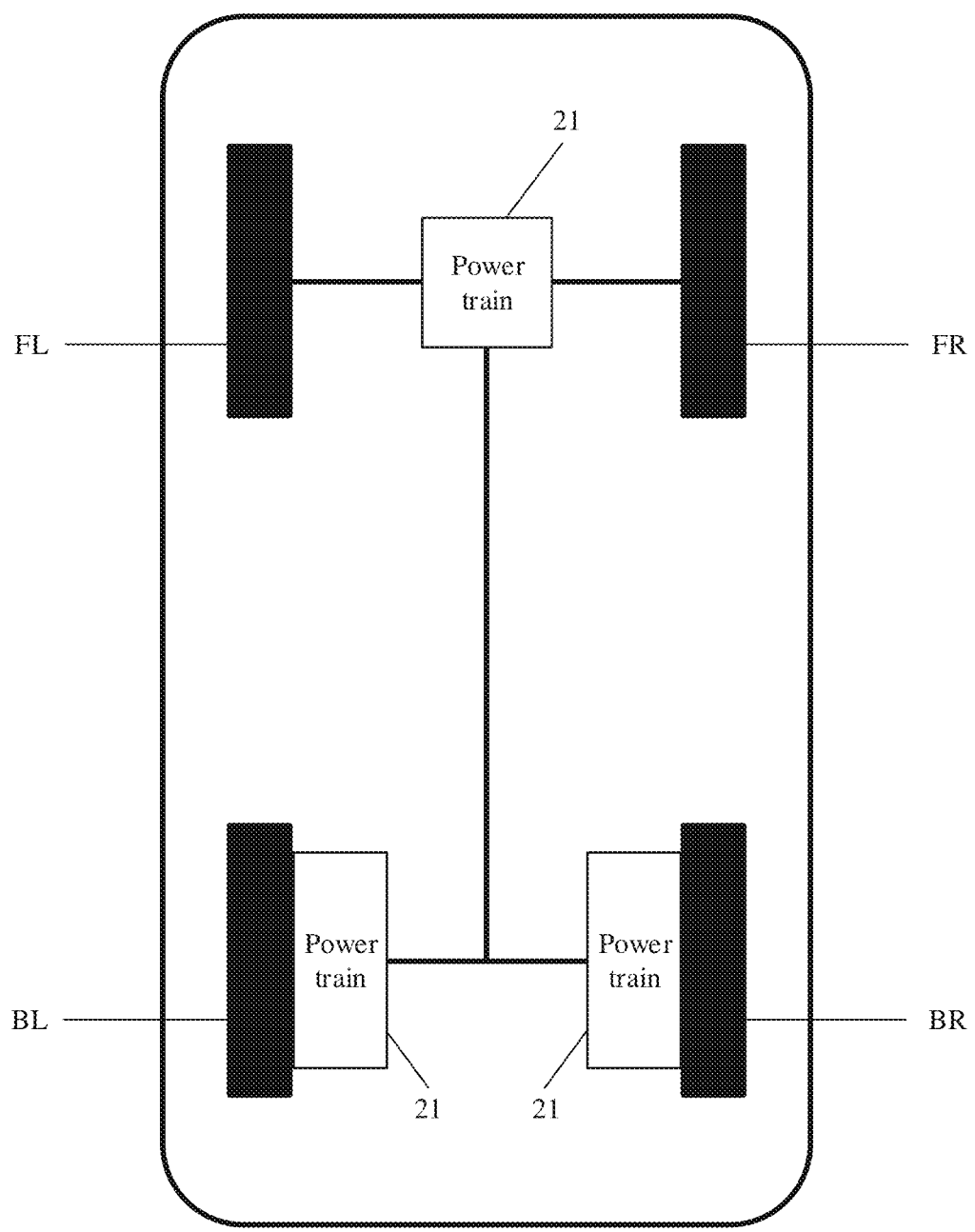
FIG. 1a is a schematic diagram depicting a structure of an on-board distributed drive system according to an embodiment of this application.
Figure 1B:
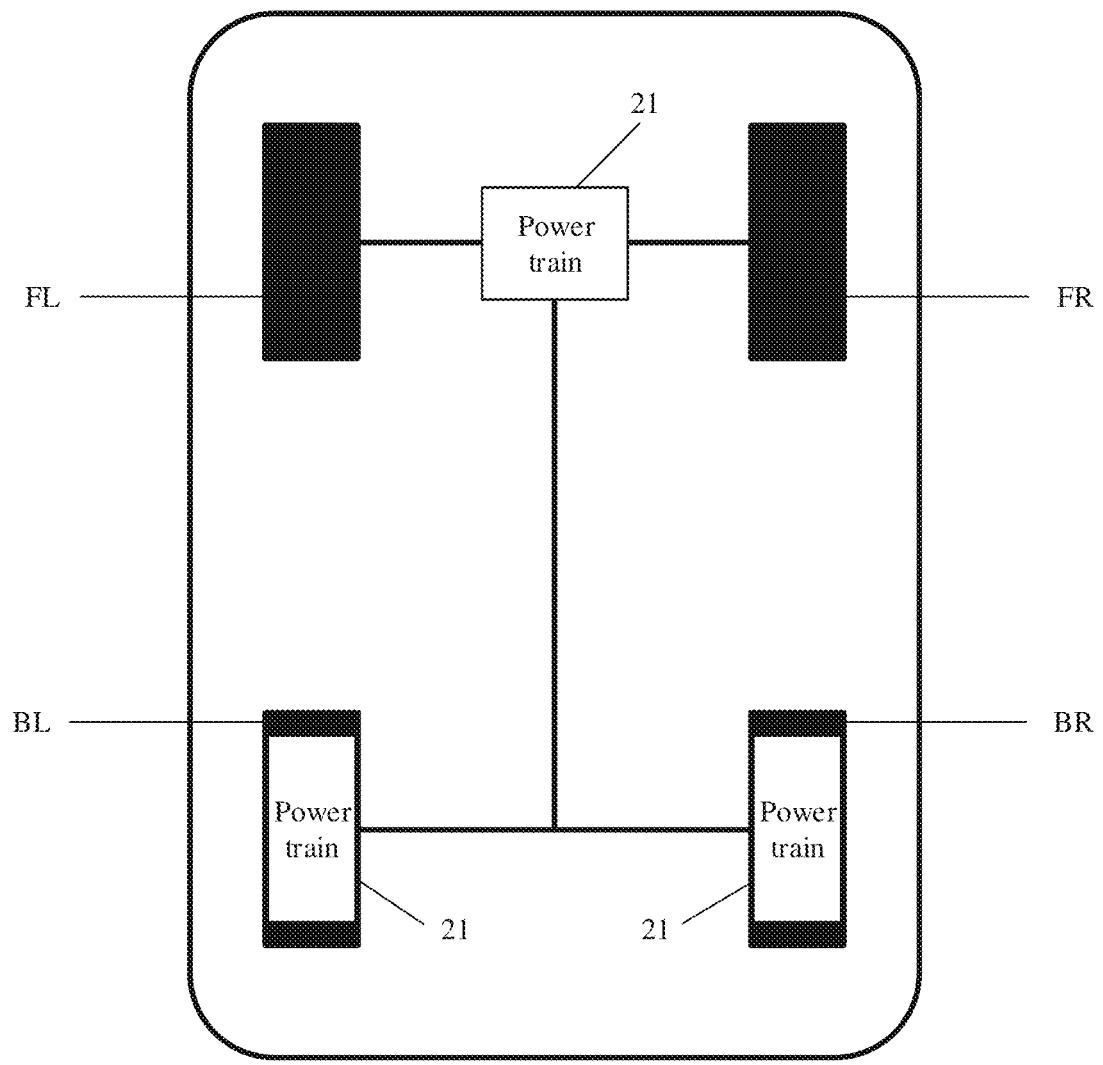
FIG. 1b is another schematic diagram depicting a structure of an on-board distributed drive system according to an embodiment of this application.

Structure 1:

FIG. 1a is a schematic diagram depicting a structure of an on-board distributed drive system according to an embodiment of this application. FIG. 1b is another schematic diagram depicting a structure of an on-board distributed drive system according to an embodiment of this application. As shown in FIG. 1a and FIG. 1b, the on-board distributed drive system may include three power trains 21. One power train 21 is configured to drive a front left wheel FL and a front right wheel FR, and the other two power trains 21 are respectively configured to drive a back left wheel BL and a back right wheel BR. The power trains 21 configured to drive the back left wheel BL and the back right wheel BR in FIG. 1a are wheel-side motor power trains, and the power trains 21 configured to drive the back left wheel BL and the back right wheel BR in FIG. 1b are wheel-hub motor power trains.

Figure 2:
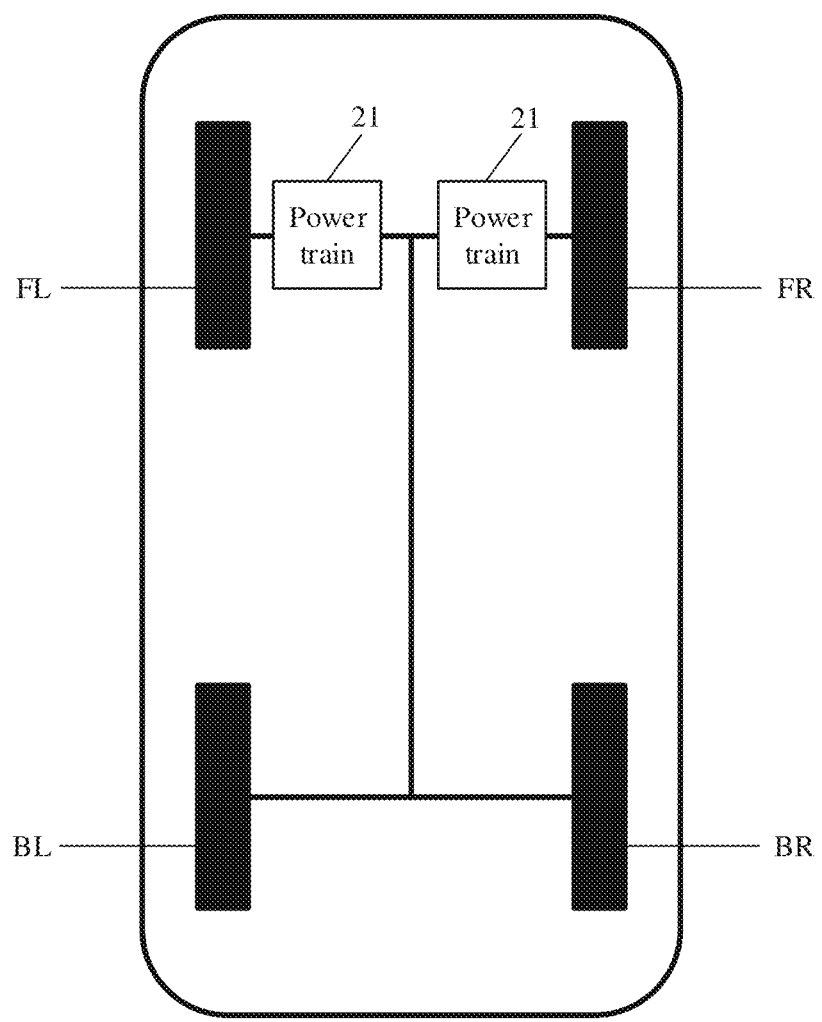
FIG. 2 is another schematic diagram depicting a structure of an on-board distributed drive system according to an embodiment of this application.

Structure 2:

FIG. 2 is another schematic diagram depicting a structure of an on-board distributed drive system according to an embodiment of this application. As shown in FIG. 2, the on-board distributed drive system may include two power trains 21, and the two power trains 21 are respectively configured to drive a front left wheel FL and a front right wheel FR. The front left wheel FL and the front right wheel FR are driven to roll, and a back left wheel BL and a back right wheel BR are driven to roll, so that the electric vehicle is driven to travel.

Figure 3:
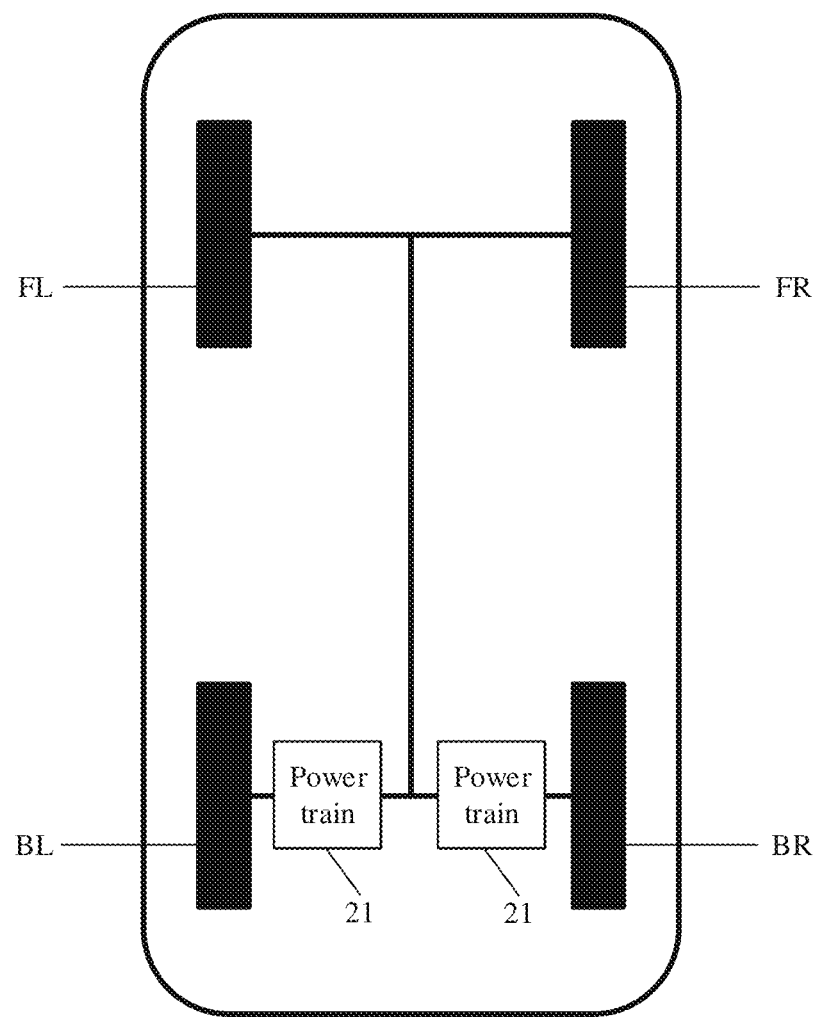
FIG. 3 is another schematic diagram depicting a structure of an on-board distributed drive system according to an embodiment of this application.

Structure 3:

FIG. 3 is another schematic diagram depicting a structure of an on-board distributed drive system according to an embodiment of this application. As shown in FIG. 3, the on-board distributed drive system may include two power trains 21, and the two power trains 21 are respectively configured to drive a back left wheel BL and a back right wheel BR. The back left wheel BL and the back right wheel BR are driven to roll, and a front left wheel FL and a front right wheel FR are driven to roll, so that the electric vehicle is driven to travel.

Figure 4A:
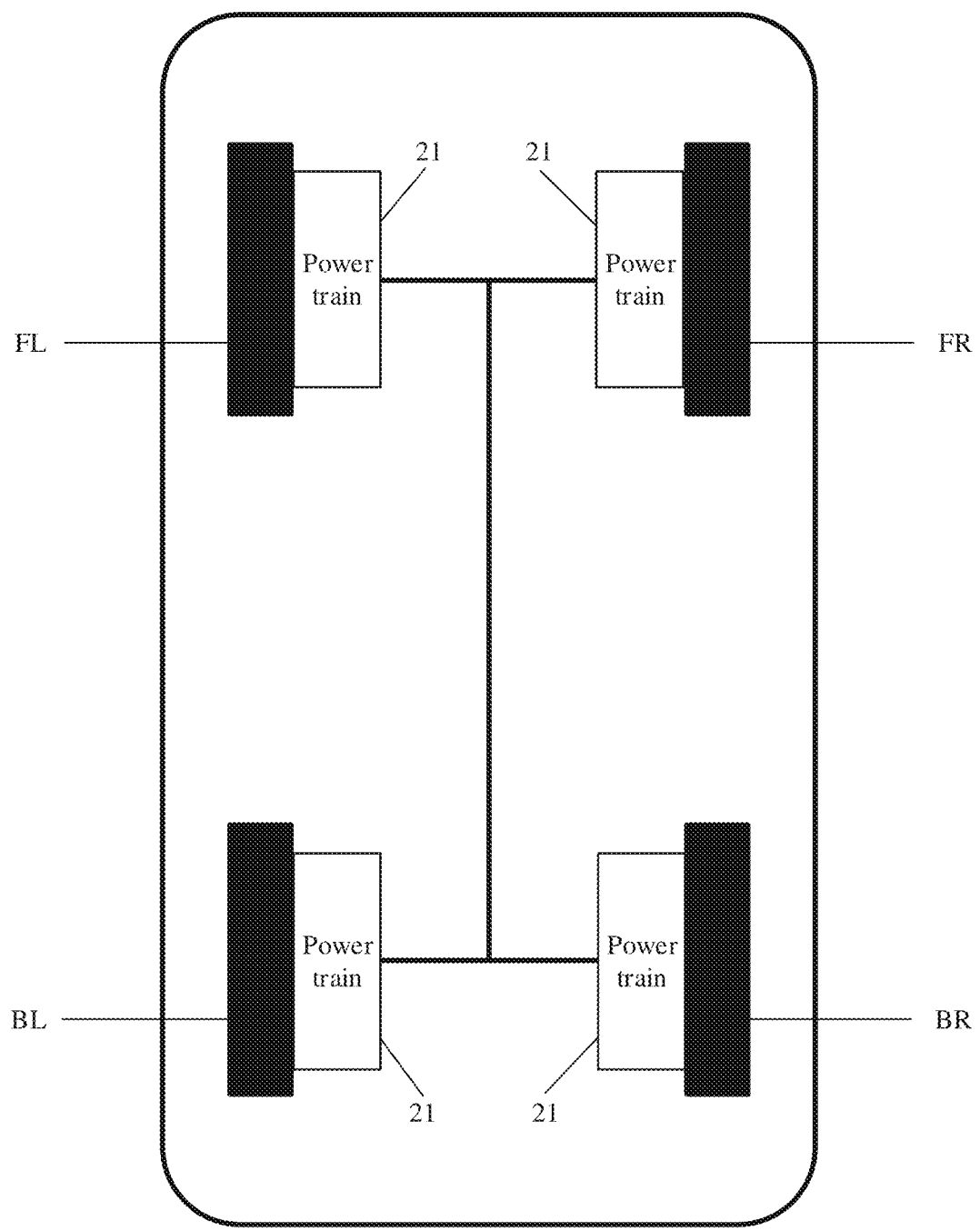
FIG. 4a is another schematic diagram depicting a structure of an on-board distributed drive system according to an embodiment of this application.
Figure 4B:
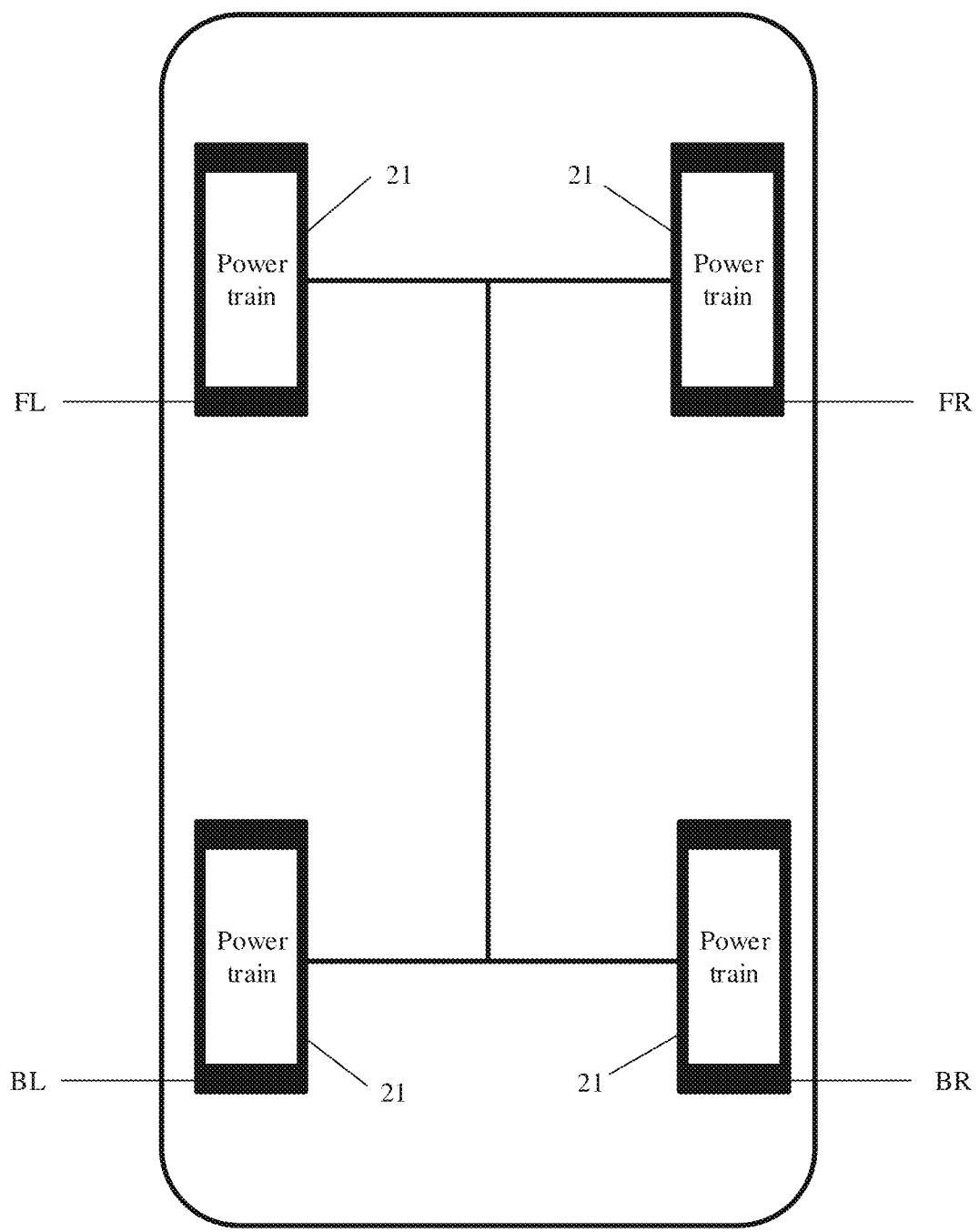
FIG. 4b is another schematic diagram depicting a structure of an on-board distributed drive system according to an embodiment of this application.

Structure 4:

FIG. 4a is another schematic diagram depicting a structure of an on-board distributed drive system according to an embodiment of this application. FIG. 4b is another schematic diagram depicting a structure of an on-board distributed drive system according to an embodiment of this application. As shown in FIG. 4a and FIG. 4b, the on-board distributed drive system may include four power trains 21. The four power trains 21 are respectively configured to drive a front left wheel FL, a front right wheel FR, a back left wheel BL, and a back right wheel BR. The four power trains 21 in FIG. 4a are all wheel-side motor power trains, and the four power trains 21 in FIG. 4b are all wheel-hub motor power trains.

In a related technology, a centralized power supply architecture is used in the on-board distributed drive system. The centralized power supply architecture includes one high-voltage battery pack, and power is supplied to a component such as the power train in the drive system by using the high-voltage battery pack. The high-voltage battery pack generally includes a housing and a plurality of battery cells packaged inside the housing, and the plurality of battery cells in the high-voltage battery pack are connected in series. Because the high-voltage battery pack has an integral structure, once a battery cell inside the high-voltage battery pack is faulty, the entire high-voltage battery pack cannot work. Consequently, a vehicle power supply system fails, the electric vehicle cannot continue to travel, and even a traffic accident occurs. Therefore, the centralized power supply architecture has poor power supply reliability and low system safety, and cannot meet a safety requirement in future intelligent driving.

Based on this, the embodiments of this application provide an on-board distributed power supply system and an on-board power supply control method and apparatus. Corresponding to the on-board distributed drive system, the on-board distributed power supply system in this application is applied to various electric vehicles having an on-board distributed drive system or another vehicle that needs to be driven by a motor. This is not limited herein.

To make objectives, technical solutions, and advantages of this application more clearly, the following further describes this application in detail with reference to the accompanying drawings. It should be noted that, in this specification, reference numerals and letters in the following accompanying drawings represent similar items. Therefore, once an item is defined in an accompanying drawing, the item does not need to be further defined or interpreted in subsequent accompanying drawings.

Figure 5:
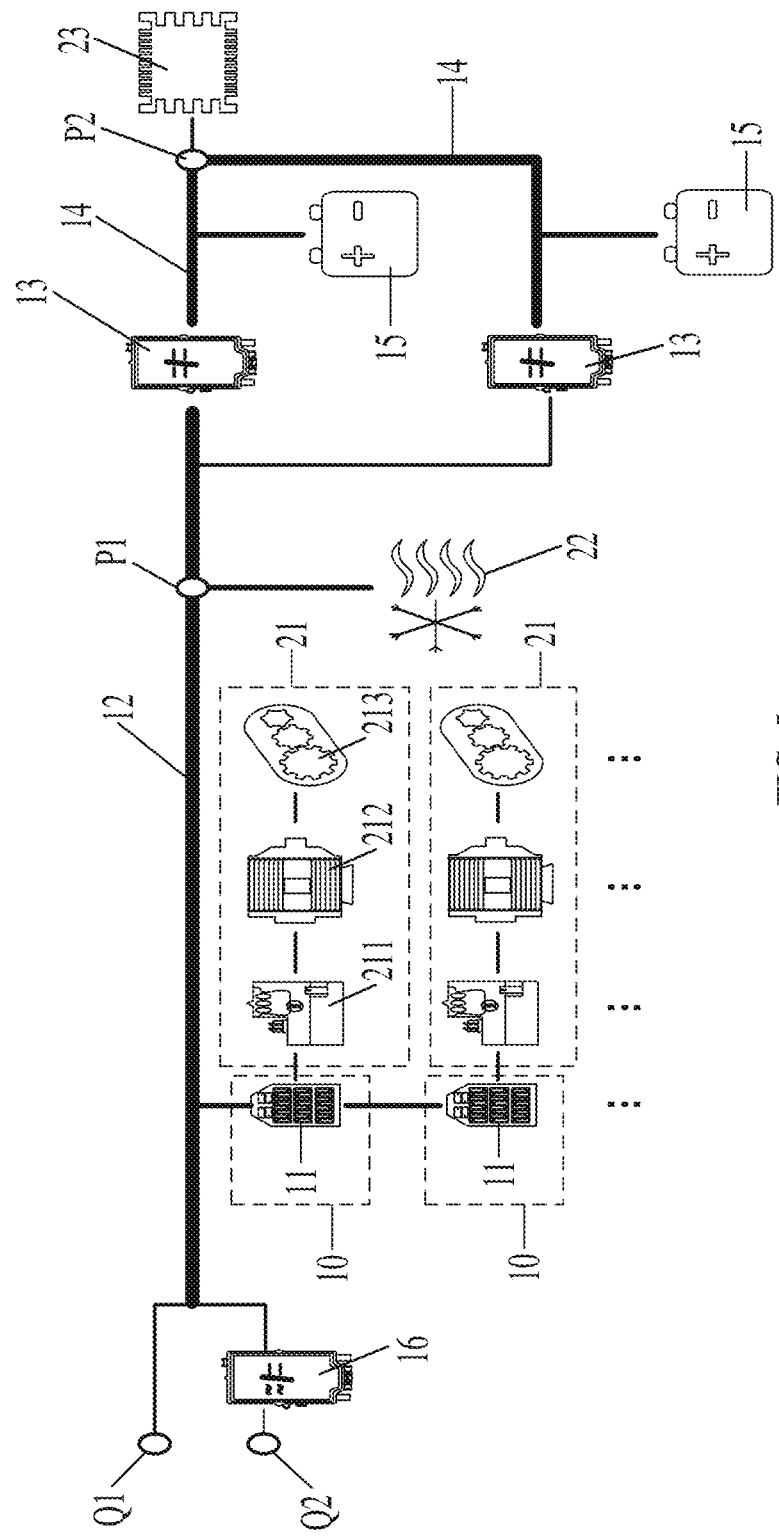
FIG. 5 is a schematic diagram depicting a structure of an on-board distributed power supply system according to an embodiment of this application.
Figure 6:
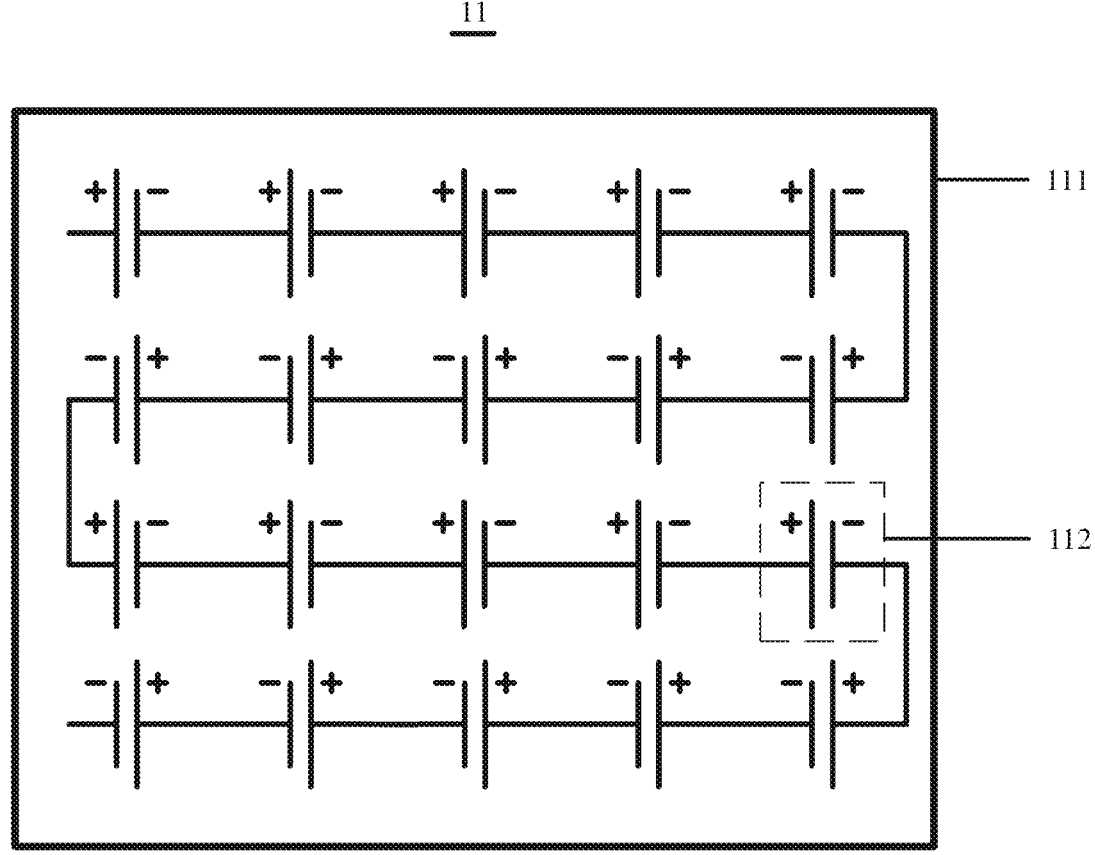
FIG. 6 is a schematic diagram depicting a structure of a low-voltage battery pack according to an embodiment of this application.

FIG. 5 is a schematic diagram depicting a structure of an on-board distributed power supply system according to an embodiment of this application. FIG. 6 is a schematic diagram depicting a structure of a low-voltage battery pack according to an embodiment of this application. With reference to FIG. 5 and FIG. 6, the on-board distributed power supply system may include at least two low-voltage battery pack groups 10. Each low-voltage battery pack group 10 includes at least one low-voltage battery pack 11. Each low-voltage battery pack 11 includes a plurality of battery cells 112. Each low-voltage battery pack group 10 is correspondingly electrically connected to at least one power train 21 in an on-board distributed drive system to provide electric energy for each power train 21 in the on-board distributed drive system. One power train 21 may include components such as a motor control unit 211, a motor 212, and a reducer 213. In this embodiment of this application, power is supplied to the power train in the on-board distributed drive system by using at least two low-voltage battery pack groups 10. When a low-voltage battery pack 11 in any low-voltage battery pack group 10 is faulty, remaining low-voltage battery pack groups 10 may continue to work. Therefore, this can avoid a failure of the entire power supply system and improve power supply reliability and safety of the power supply system.

As shown in FIG. 6, the low-voltage battery pack 11 may include a plurality of battery cells 112. The plurality of battery cells 112 in the low-voltage battery pack 11 may be connected in series. In addition, each low-voltage battery pack 11 may further include a housing 111, and the plurality of battery cells 112 in the low-voltage battery pack 11 are packaged inside the housing 111. The battery cell 112 may be a lithium battery, or the battery cell 112 may be another type of battery cell. This is not limited herein. In FIG. 6, an example in which the low-voltage battery pack 11 includes twenty battery cells 112 is used for illustration. During specific implementation, a quantity of battery cells 112 in the low-voltage battery pack 11 may be set based on an actual requirement. This is not limited herein. In this embodiment of this application, the low-voltage battery pack may be a battery pack whose rated voltage is less than 400 V. To meet a power supply requirement of the on-board distributed drive system, a total sum of rated voltages of the low-voltage battery packs 11 in the on-board distributed power supply system in this application needs to be greater than or equal to an electricity quantity required by the on-board distributed drive system. For example, an electricity quantity required by a distributed drive electric vehicle is about 400 V. An example in which the on-board distributed power supply system includes four low-voltage battery packs 11, rated voltages of the low-voltage battery packs 11 are approximately equal, and a rated voltage of each battery cell 112 is about 2.5 V is used. In this case, there may be about 40 battery cells 112 in each low-voltage battery pack 11.

In this embodiment of this application, the low-voltage battery pack group 10 may include one low-voltage battery pack 11 or at least two low-voltage battery packs 11 connected in series. In an actual application process, a quantity of low-voltage battery packs in the low-voltage battery pack group may be set based on a required rated voltage of the low-voltage battery pack group.

In actual application, a quantity of low-voltage battery pack groups in the on-board distributed power supply system and a correspondence between the low-voltage battery pack groups and the power trains may be set based on a specific structure of the on-board distributed drive system. To provide electric energy for the on-board distributed drive system, the low-voltage battery pack groups in this embodiment of this application may be disposed in the following manners.

Manner 1: The low-voltage battery pack groups in the on-board distributed power supply system are electrically connected to the power trains in the on-board distributed drive system in a one-to-one correspondence manner.

Figure 7:
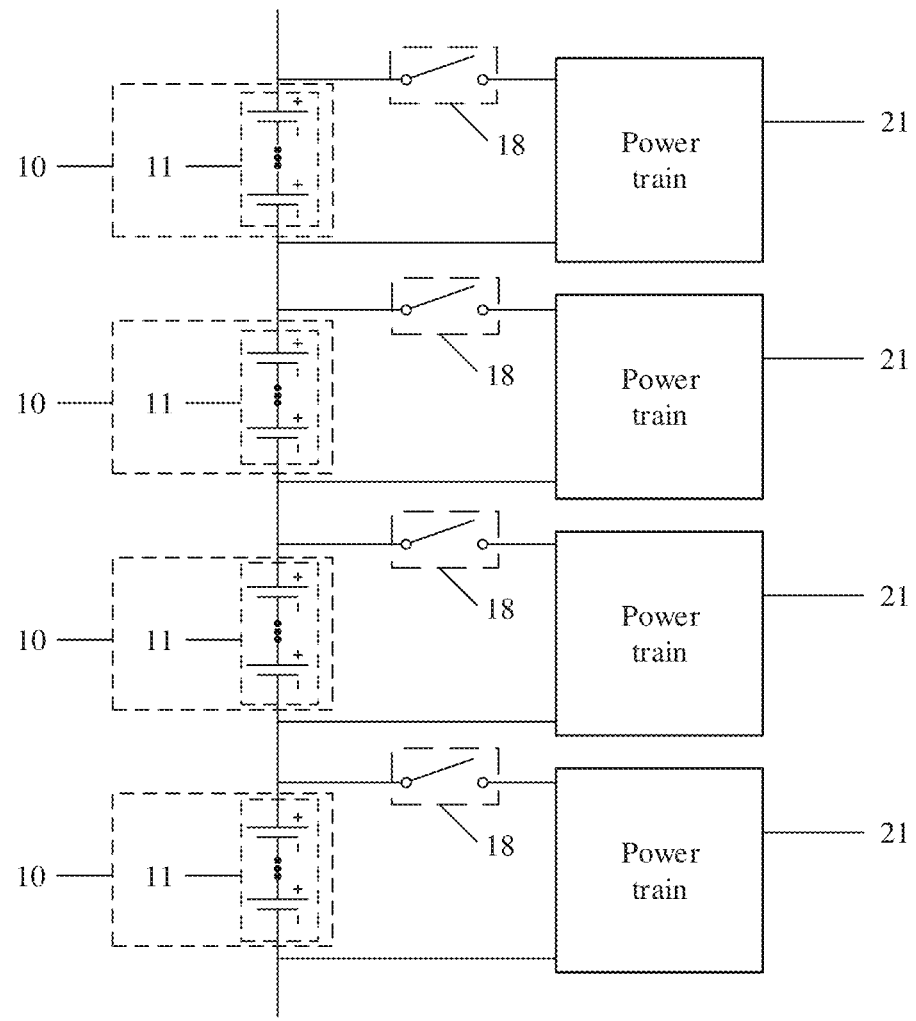
FIG. 7 is a schematic diagram of a correspondence between low-voltage battery packs and power trains according to an embodiment of this application.

FIG. 7 is a schematic diagram of a correspondence between low-voltage battery pack groups and power trains according to an embodiment of this application. As shown in FIG. 7, the low-voltage battery pack groups 10 in the on-board distributed power supply system are electrically connected to the power trains 21 in the on-board distributed drive system in a one-to-one correspondence manner. In other words, a system shown in FIG. 7 includes four low-voltage battery pack groups 10 and four power trains 21. Each low-voltage battery pack group 10 includes one low-voltage battery pack 11, and each low-voltage battery pack group 10 is correspondingly connected to one power train 21, namely, a quantity of low-voltage battery packs 11 is consistent with a quantity of power trains 21. In FIG. 7, an example in which there are four power trains 21 is used for illustration. During specific implementation, when the on-board distributed drive system has another structure (for example, any one of the foregoing structures 1 to 4), the low-voltage battery pack groups may be arranged in a one-to-one correspondence with the power trains.

Figure 8:
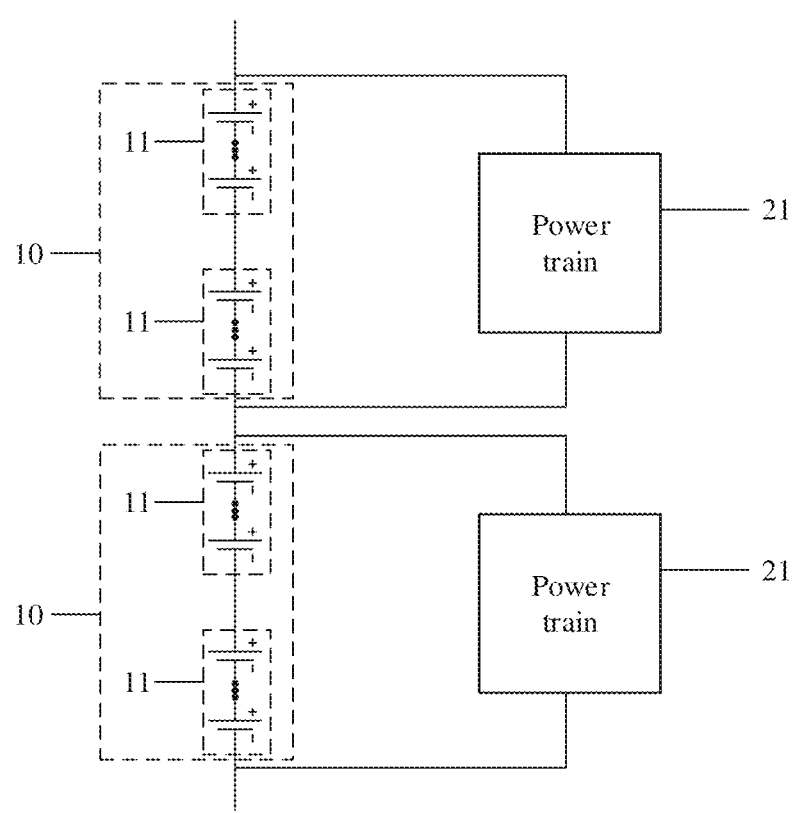
FIG. 8 is a schematic diagram of another correspondence between low-voltage battery packs and power trains according to an embodiment of this application.

FIG. 8 is a schematic diagram of another correspondence between low-voltage battery packs and power trains according to an embodiment of this application. A system shown in FIG. 8 includes two low-voltage battery pack groups 10 and two power trains 21, each low-voltage battery pack group 10 is correspondingly connected to one power train 21, and each low-voltage battery pack group 10 includes two or more low-voltage battery packs 11 connected in series. In FIG. 8, an example in which each power train 21 is electrically connected to two low-voltage battery packs 11 connected in series is used for illustration. A quantity of low-voltage battery packs 11 electrically connected to each power train 21 is not limited herein.

Manner 2: Each low-voltage battery pack group in the on-board distributed power supply system is electrically connected to at least two power trains connected in parallel.

Figure 9:
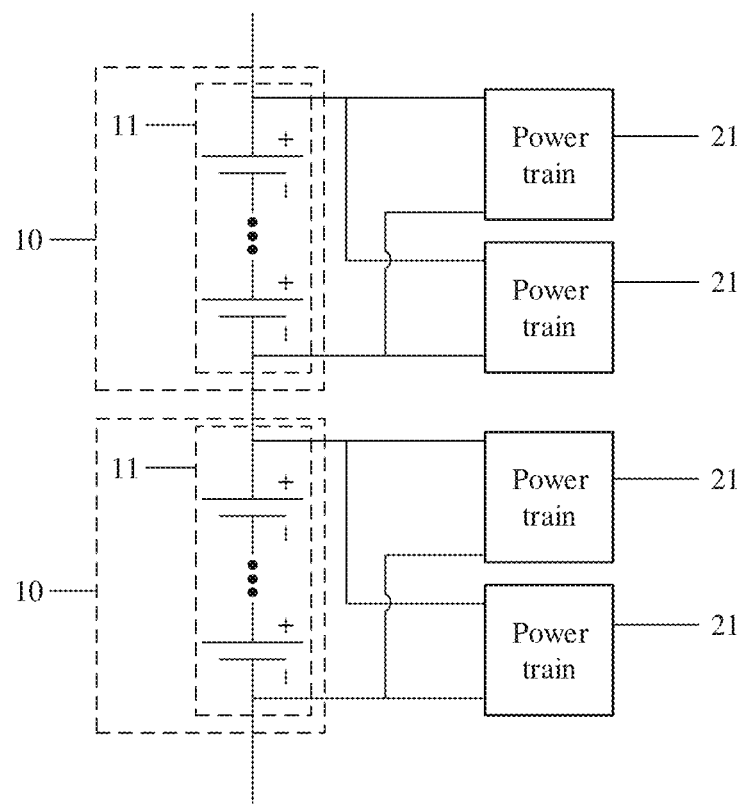
FIG. 9 is a schematic diagram of another correspondence between low-voltage battery packs and power trains according to an embodiment of this application.

FIG. 9 is a schematic diagram of another correspondence between low-voltage battery packs and power trains according to an embodiment of this application. As shown in FIG. 9, a system shown in FIG. 9 includes two low-voltage battery pack groups 10 and four power trains 21, each low-voltage battery pack group 10 is electrically connected to two power trains 21 connected in parallel, and each low-voltage battery pack group 10 includes one low-voltage battery pack 11. In other words, at least two power trains 21 may be connected in parallel at two electrodes of a same low-voltage battery pack group 10. In FIG. 9, an example in which each low-voltage battery pack group 10 is electrically connected to two power trains 21 is used for illustration. A quantity of power trains 21 electrically connected to each low-voltage battery pack group 10 is not limited herein.

In addition, in this embodiment of this application, Manner 1 may be combined with Manner 2. For example, when the specific structure of the on-board distributed drive system is the structure 1 shown in FIG. 1a, a power train 21 corresponding to front wheels may be electrically connected to at least two low-voltage battery packs connected in series, and two power trains 21 corresponding to rear wheels may be connected in parallel at two electrodes of a same low-voltage battery pack group. During specific implementation, the correspondence between the power trains and the low-voltage battery packs may be set based on the specific structure of the on-board distributed drive system and an electricity quantity requirement of the power train. Examples are not provided one by one herein.

In this embodiment of this application, in addition to providing electric energy for each power train 21, the low-voltage battery pack 11 may further supply power to another load in a vehicle.

In some embodiments of this application, as shown in FIG. 5, the on-board distributed power supply system may further include a high-voltage direct current bus 12. At least some of the low-voltage battery packs 11 are connected in series, and the low-voltage battery packs 11 connected in series are electrically connected to a high-voltage component 22 in the vehicle (for example, an electric vehicle) by using the high-voltage direct current bus 12. Optionally, the high-voltage direct current bus 12 may be electrically connected to a high-voltage load interface P1. The high-voltage component 22 in the vehicle may be electrically connected to the high-voltage direct current bus 12 through the high-voltage load interface P1. In addition, the high-voltage component 22 in the vehicle may be electrically connected to the high-voltage direct current bus 12 in another manner, for example, the high-voltage component 22 is directly electrically connected to the high-voltage direct current bus 12. This is not limited herein. In this embodiment of this application, two or more low-voltage battery packs 11 are connected in series, so that a total electricity quantity of the low-voltage battery packs 11 connected in series can meet an electricity quantity requirement of the high-voltage component 22. The high-voltage direct current bus 12 may be used as a channel for transmitting high-voltage electric energy, to provide electric power of each low-voltage battery pack 11 for the high-voltage component 22. The high-voltage component 22 may be a component such as an air conditioner. In actual application, a quantity of low-voltage battery packs 11 connected in series may be set based on the electricity quantity requirement of the high-voltage component 22. That is, some of the low-voltage battery packs 11 are connected in series.

Still refer to FIG. 5. The on-board distributed power supply system in this embodiment of this application may further include at least two direct current to direct current converters 13 and a low-voltage bus 14. The direct current to direct current converters 13 are connected in parallel, and are electrically connected to the high-voltage direct current bus 12. The direct current to direct current converter 13 is electrically connected to a low-voltage component 23 in the vehicle (for example, an electric vehicle) through the low-voltage bus 14. Optionally, the low-voltage bus 14 may be electrically connected to a low-voltage load interface P2. The low-voltage component 23 in the vehicle may be electrically connected to the low-voltage bus 14 through the low-voltage load interface P2. In addition, the low-voltage component 23 in the vehicle may be electrically connected to the low-voltage bus 14 in another manner, for example, the low-voltage component 23 is directly electrically connected to the low-voltage bus 14. This is not limited herein. The direct current to direct current converter 13 may be a phase-shift full-bridge converter or a flyback DC/DC converter. The direct current to direct current converter 13 may convert a voltage of the high-voltage direct current bus 12 into a low-voltage direct current power, to provide electric energy for the low-voltage component 23. The low-voltage bus 14 is a channel for transmitting low-voltage electric energy, to provide, for the low-voltage component 23, the low-voltage direct current power that is output by the direct current to direct current converter 13.

The low-voltage component 23 may be a control system of the electric vehicle, and the low-voltage component 23 has a high requirement on power supply reliability. At least two direct current to direct current converters 13 connected in parallel are disposed, so that power can be supplied to the low-voltage component 23 in a redundancy backup manner. This improves power supply reliability of the low-voltage component 23. In an actual working process, the direct current to direct current converters 13 may be controlled to work simultaneously. When it is detected that a first direct current to direct current converter in all the direct current to direct current converters 13 is faulty, output power of direct current to direct current converters 13 other than the first direct current to direct current converter may be increased, to continue to supply power to the low-voltage component 23. Alternatively, one direct current to direct current converter 13 in all the direct current to direct current converters 13 may be controlled to work, and remaining direct current to direct current converters 13 may be controlled to be in a standby state (the converters are powered on but do not output power); and when it is detected that the direct current to direct current converter 13 in a working state is faulty, one of the direct current to direct current converters 13 other than the faulty direct current to direct current converter 13 is controlled to output power, to continue to supply power to the low-voltage component 23. In this way, it can be ensured that electric energy is continuously supplied to the low-voltage component 23, to prevent the electric vehicle from being out of control or incapable of traveling because electric energy fails to be supplied to the low-voltage component 23.

Still refer to FIG. 5. The on-board distributed power supply system in this embodiment of this application may further include at least two low-voltage batteries 15. The low-voltage battery 15 is electrically connected to the direct current to direct current converter 13, and the direct current to direct current converter 13 may supply power to the low-voltage battery 15. The low-voltage battery 15 may store low-voltage electric energy, and the low-voltage battery 15 is electrically connected to the low-voltage component 23 through the low-voltage bus 14. Therefore, the low-voltage battery 15 may supply power to the low-voltage component 23. In this way, when the direct current to direct current converter 13 is faulty, the low-voltage battery 15 may still supply power to the low-voltage component 23, to ensure that electric energy is continuously supplied to the low-voltage component 23. Therefore, this can further improve power supply reliability of the low-voltage component 23.

In addition, in this embodiment of this application, as shown in FIG. 5, the on-board distributed power supply system may further include an on-board charger 16. The on-board charger 16 may convert an external alternating current power into a high-voltage direct current power, to charge each low-voltage battery pack 11 by using the high-voltage direct current bus 12. In addition, the on-board distributed power supply system may further include a direct current charging interface Q1 electrically connected to the high-voltage direct current bus 12 and an alternating current charging interface Q2 electrically connected to the on-board charger 16, so that the on-board distributed power supply system can be charged by using an external power supply.

It may be learned from the foregoing descriptions that, to further provide electric energy for the high-voltage component or the low-voltage component in the vehicle, all the low-voltage battery packs or some low-voltage battery packs may be connected in series to meet the electricity quantity requirement of the high-voltage component. The following further describes a specific manner of connecting a plurality of low-voltage battery packs in series in this embodiment of this application.

Figure 10A:
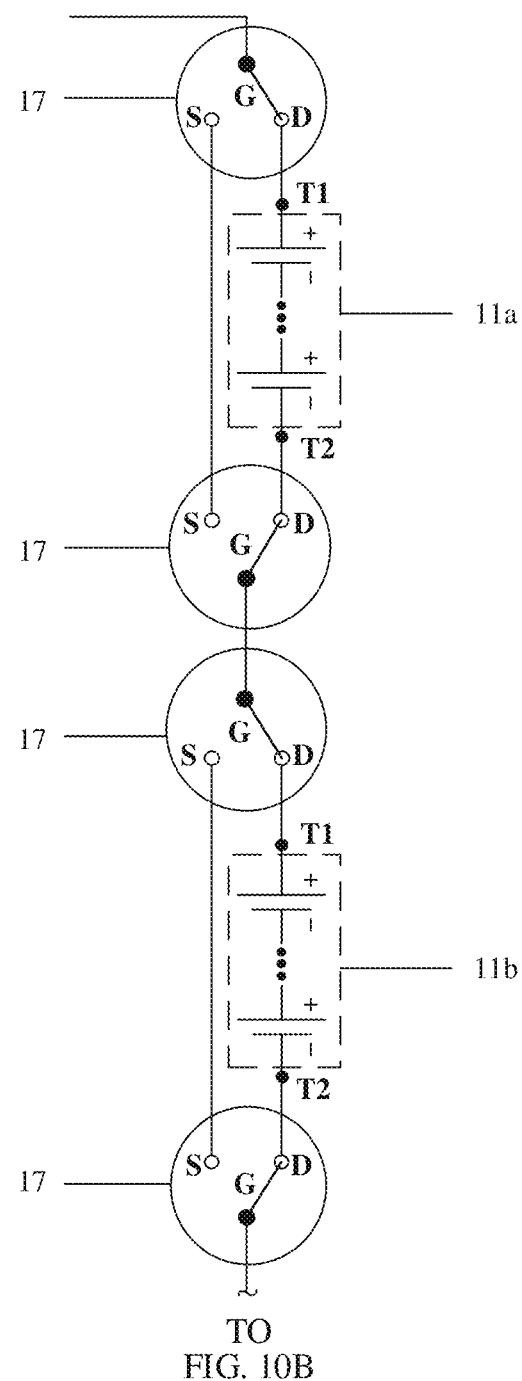
FIG. 10A and FIG. 10B are a schematic diagram of a connection relationship between low-voltage battery packs according to an embodiment of this application.
Figure 10B:
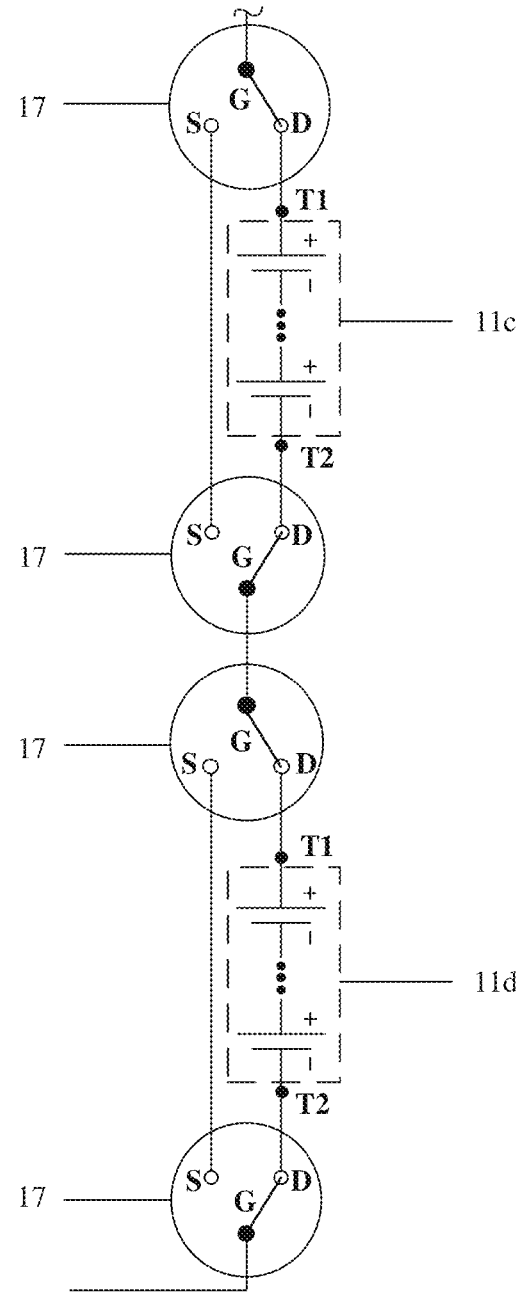

FIG. 10A and FIG. 10B are a schematic diagram of a connection relationship between low-voltage battery packs according to an embodiment of this application. As shown in FIG. 10A and FIG. 10B, the on-board distributed power supply system in this embodiment of this application may further include a plurality of switches 17. The switches 17 each may include a contact blade G, a first contact S, and a second contact D. The contact blade G is electrically connected to a control end of the switch 17. The control end of the switch 17 may be electrically connected to a control signal cable, and different voltages may be applied to the control end of the switch 17 by using the control signal cable, to control the contact blade G to be electrically connected to the first contact S or the second contact D. A plurality of switches 17 are disposed, so that the low-voltage battery packs (for example, 11a, 11b, 11c, and 11d in FIG. 10A and FIG. 10B) can be connected in series. Specifically, a first electrode T1 of each low-voltage battery pack is electrically connected to a second contact D of one of the switches 17, and a second electrode T2 is electrically connected to a second contact D of another of the switches 17. In FIG. 10A and FIG. 10B, an example in which the first electrode T1 of the low-voltage battery pack is a positive electrode and the second electrode T2 is a negative electrode is used for illustration. Certainly, the first electrode T1 of the low-voltage battery pack may be set as a negative electrode, and the second electrode T2 may be set as a positive electrode. This is not limited herein. First contacts S of the two switches 17 connected to each low-voltage battery pack are electrically connected. In two adjacent low-voltage battery packs (for example, 11a and 11b in FIG. 10A) that are connected to each other, a contact blade G of a switch 17 connected to a first electrode T1 of one (for example, 11b in FIG. 10A) of the low-voltage battery packs is electrically connected to a contact blade G of a switch 17 connected to a second electrode T2 of the other (for example, 11a in FIG. 10A) of the low-voltage battery packs.

Figures 11A, 11B:
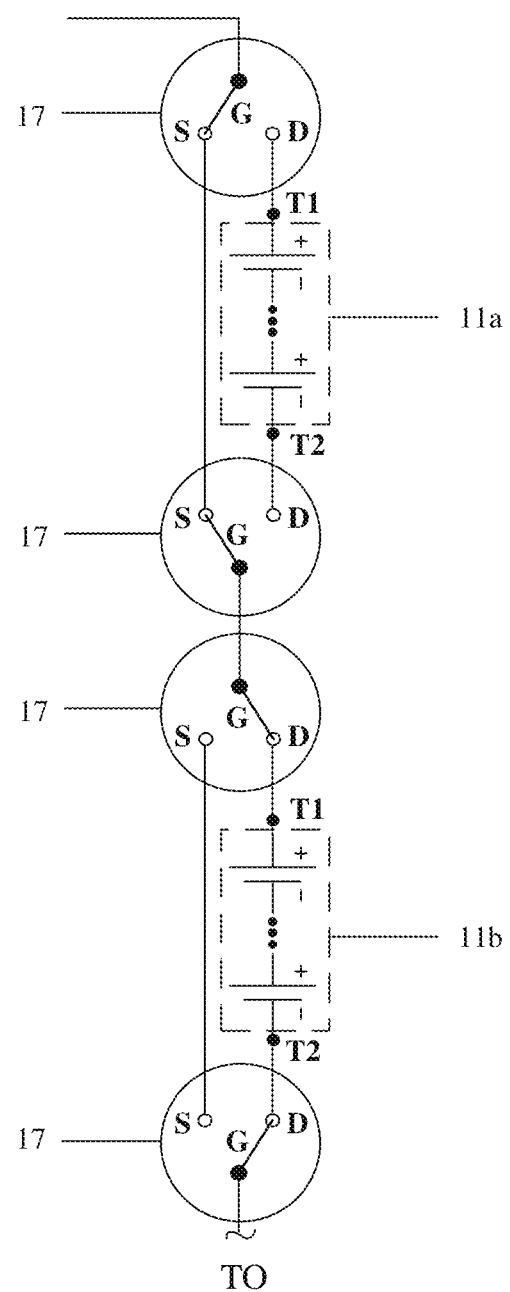
FIG. 11A and FIG. 11B are a schematic diagram of another connection relationship between low-voltage battery packs according to an embodiment of this application.
Figure 11B:
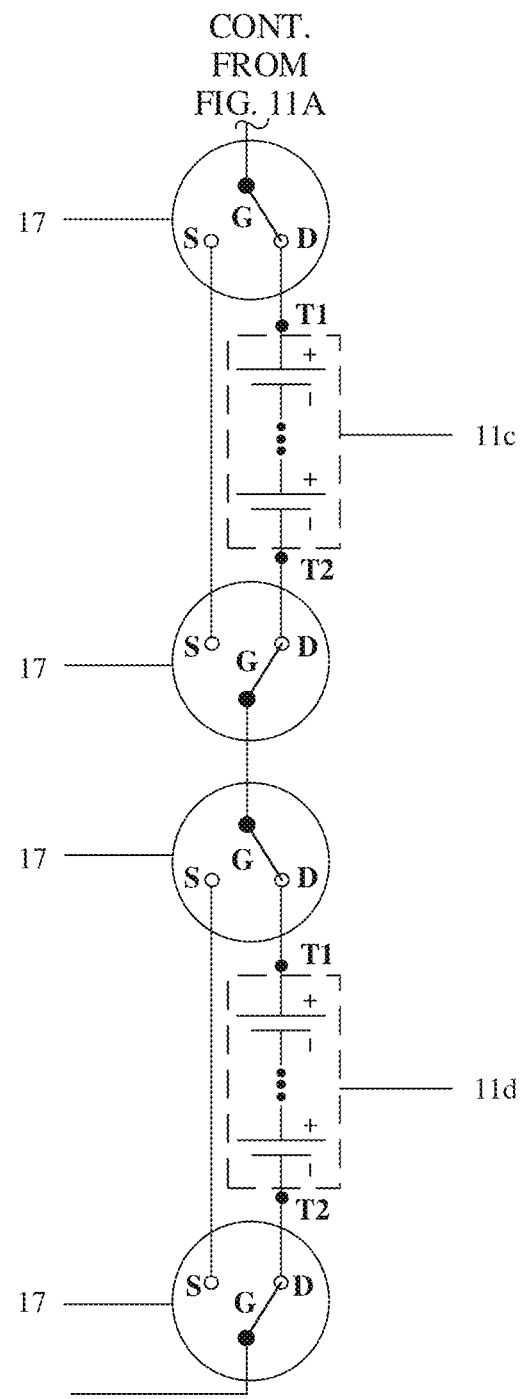
Figure 12A:
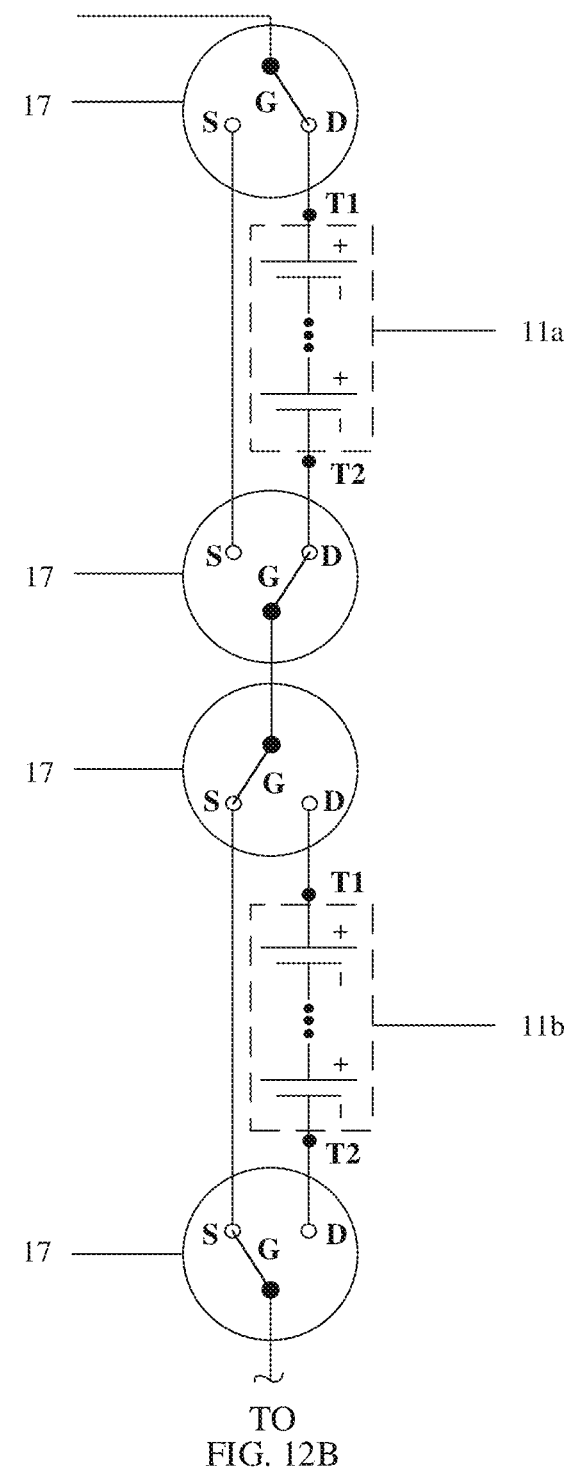
FIG. 12A and FIG. 12B are a schematic diagram of another connection relationship between low-voltage battery packs according to an embodiment of this application.
Figure 12B:
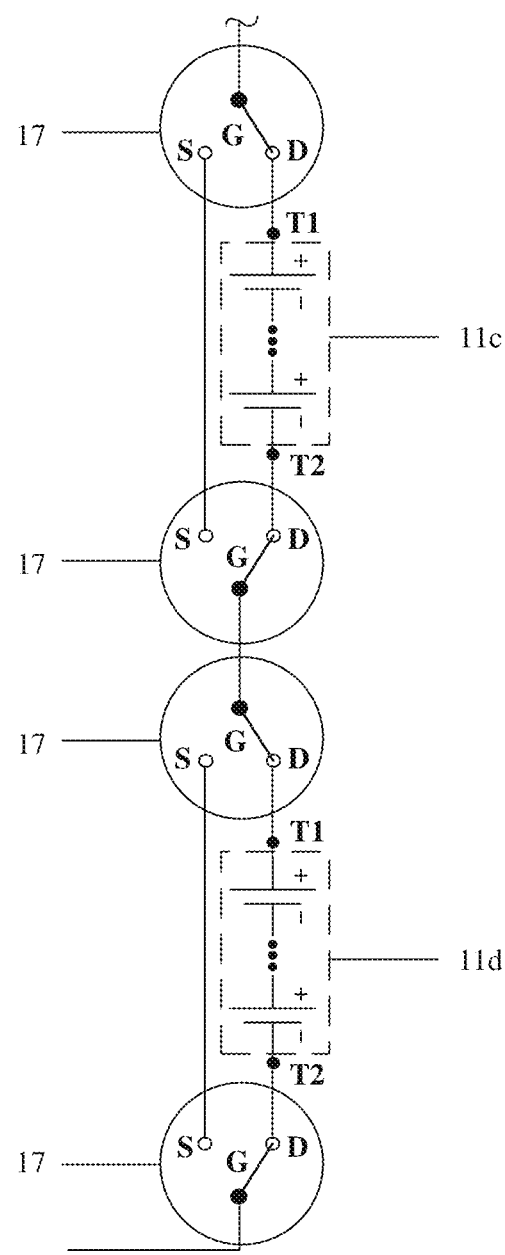
Figures 13A, 13B:
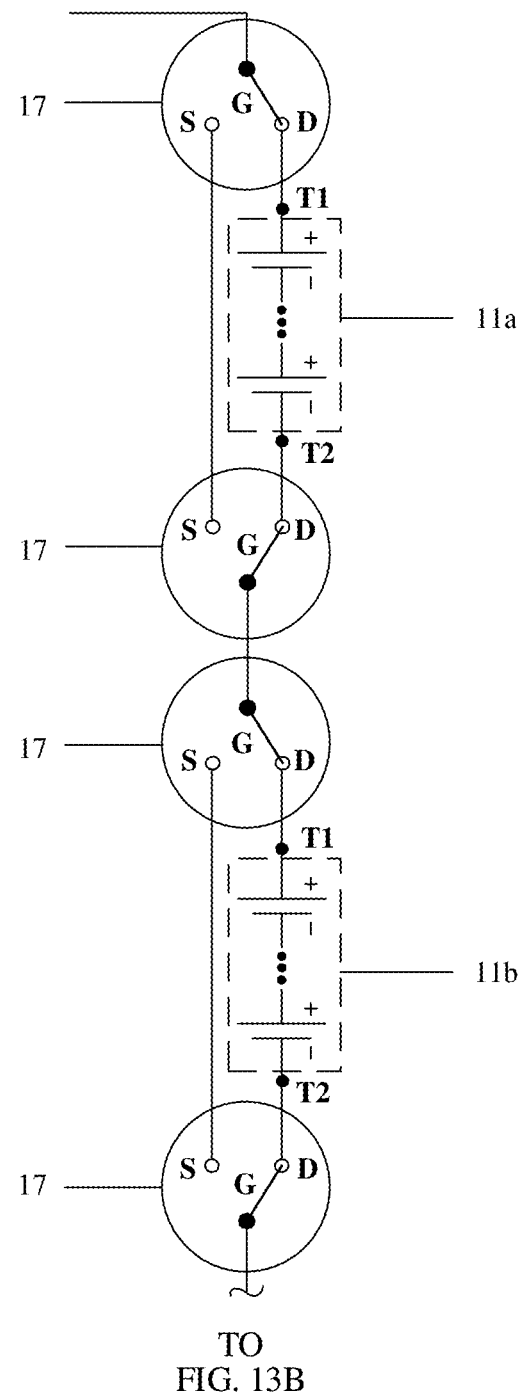
FIG. 13A and FIG. 13B are a schematic diagram of another connection relationship between low-voltage battery packs according to an embodiment of this application.
Figure 13B:
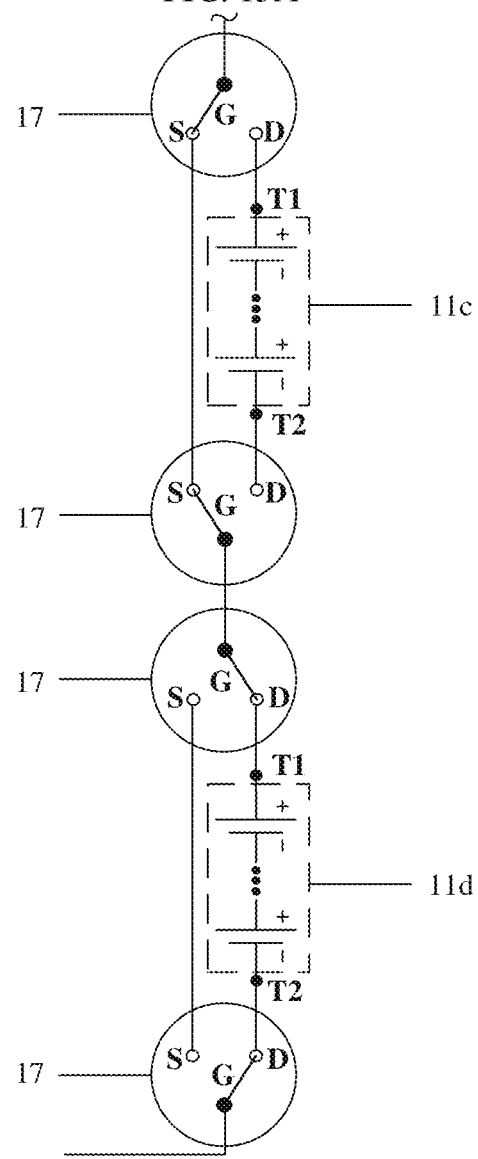
Figure 14A:
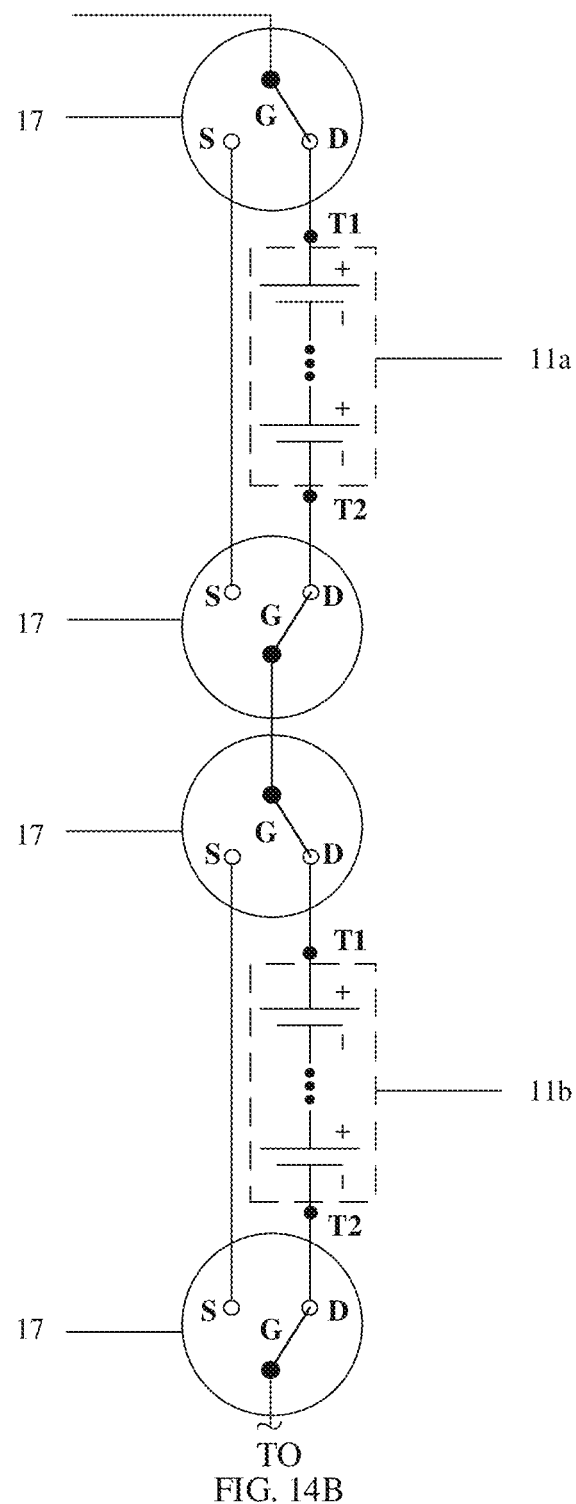
FIG. 14A and FIG. 14B are a schematic diagram of another connection relationship between low-voltage battery packs according to an embodiment of this application.
Figure 14B:
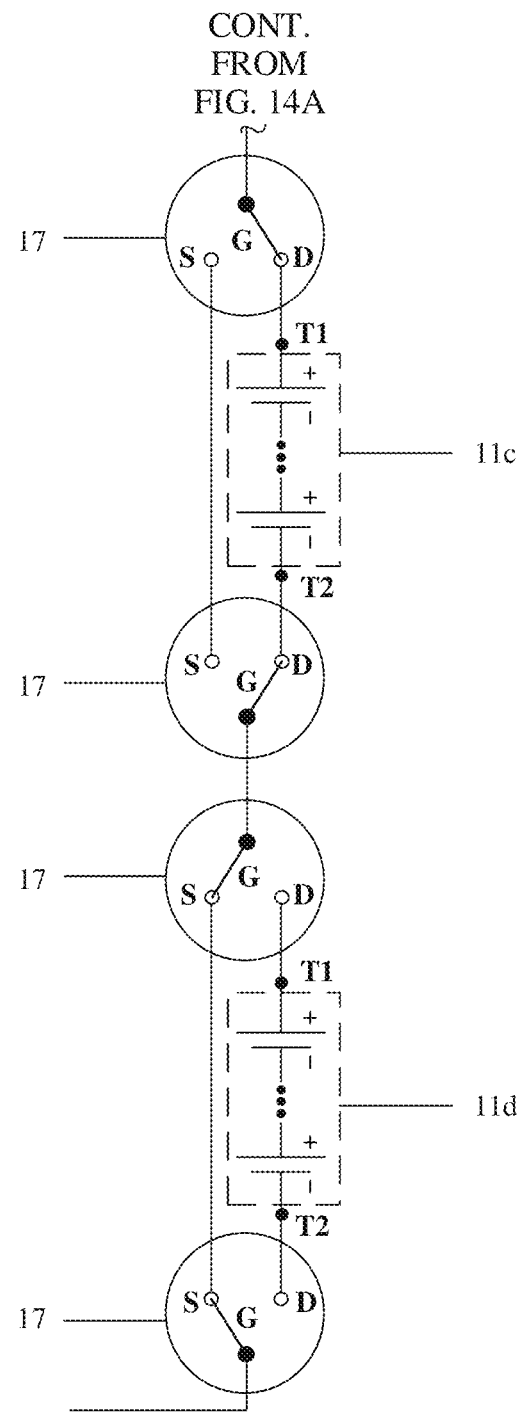

In this embodiment of this application, the low-voltage battery packs are connected in series by using the switches, and a connection status of each low-voltage battery pack may be adjusted by controlling each switch. For example, in FIG. 10A and FIG. 10B, the contact blade G of each switch 17 is switched to the second contact D, so that the low-voltage battery packs 11a, 11b, 11c, and 11d are connected in series. For example, as shown in FIG. 11A and FIG. 11B, contact blades G of switches 17 electrically connected to the low-voltage battery pack 11a are switched to first contacts S, and contact blades G of switches 17 electrically connected to the low-voltage battery packs 11b, 11c, and 11d are switched to second contacts D. In this way, the low-voltage battery pack 11a may be disconnected from the other low-voltage battery packs, and the low-voltage battery packs 11b, 11c, and 11d are connected in series. For example, as shown in FIG. 12A and FIG. 12B, contact blades G of switches 17 electrically connected to the low-voltage battery pack 11b are switched to first contacts S, and contact blades G of switches 17 electrically connected to the low-voltage battery packs 11a, 11c, and 11d are switched to second contacts D. In this way, the low-voltage battery pack 11b may be disconnected from the other low-voltage battery packs, and the low-voltage battery packs 11a, 11c, and 11d are connected in series. For example, as shown in FIG. 13A and FIG. 13B, contact blades G of switches 17 electrically connected to the low-voltage battery pack 11c are switched to first contacts S, and contact blades G of switches 17 electrically connected to the low-voltage battery packs 11a, 11b, and 11d are switched to second contacts D. In this way, the low-voltage battery pack 11c may be disconnected from the other low-voltage battery packs, and the low-voltage battery packs 11a, 11b, and 11d are connected in series. For example, as shown in FIG. 14A and FIG. 14B, contact blades G of switches 17 electrically connected to the low-voltage battery pack 11d are switched to first contacts S, and contact blades G of switches 17 electrically connected to the low-voltage battery packs 11a, 11b, and 11c are switched to second contacts D. In this way, the low-voltage battery pack 11d may be disconnected from the other low-voltage battery packs, and the low-voltage battery packs 11a, 11b, and 11c are connected in series.

In FIG. 10A to FIG. 14B, an example in which there are four low-voltage battery packs and one low-voltage battery pack is controlled to be disconnected from the other low-voltage battery packs is used for illustration. When there are another quantity of low-voltage battery packs, and two, three, or more low-voltage battery packs are controlled to be disconnected from the other low-voltage battery packs, a connection status of each low-voltage battery pack may be adjusted by controlling each switch based on a similar principle. Details are not described herein again.

Based on a design of the switch, in this embodiment of this application, when the low-voltage battery packs work, a working status of each low-voltage battery pack may be detected. When it is detected that a low-voltage battery pack is faulty, the faulty low-voltage battery pack may be disconnected from other low-voltage battery packs by controlling the switch, and the other normal low-voltage battery packs are connected in series. Therefore, the faulty low-voltage battery pack is isolated, and the normal low-voltage battery packs can continue to supply power. This further improves power supply reliability and safety of the on-board distributed power supply system, to meet a power supply requirement and a safety requirement in future intelligent driving. With reference to FIG. 10A to FIG. 14B, the following describes in detail an isolation process of a fault low-voltage battery pack by using an example in which the on-board distributed power supply system includes four low-voltage battery packs.

As shown in FIG. 10A and FIG. 10B, the low-voltage battery packs 11a, 11b, 11c, and 11d are connected to each other by using a plurality of switches 17. When the low-voltage battery packs work normally, a contact blade G of each switch 17 is switched to a second contact D, so that the low-voltage battery packs 11a, 11b, 11c, and 11d are connected in series, to control the low-voltage battery packs 11a, 11b, 11c, and 11d to supply power. As shown in FIG. 11A and FIG. 11B, when it is detected that the low-voltage battery pack 11a is faulty, contact blades G of switches 17 electrically connected to the low-voltage battery pack 11a are switched to first contacts S, and contact blades G of switches 17 electrically connected to the low-voltage battery packs 11b, 11c, and 11d are switched to second contacts D. In this way, the low-voltage battery pack 11a is disconnected from the other low-voltage battery packs, and the low-voltage battery packs 11b, 11c, and 11d are connected in series. Therefore, the faulty low-voltage battery pack 11a is isolated, and the normal low-voltage battery packs 11b, 11c, and 11d continue to supply power. As shown in FIG. 12A and FIG. 12B, contact blades G of switches 17 electrically connected to the low-voltage battery pack 11b are switched to first contacts S, and contact blades G of switches 17 electrically connected to the low-voltage battery packs 11a, 11c, and 11d are switched to second contacts D. In this way, the low-voltage battery pack 11b is disconnected from the other low-voltage battery packs, and the low-voltage battery packs 11a, 11c, and 11d are connected in series. Therefore, the faulty low-voltage battery pack 11b is isolated, and the normal low-voltage battery packs 11a, 11c, and 11d continue to supply power. As shown in FIG. 13A and FIG. 13B, contact blades G of switches 17 electrically connected to the low-voltage battery pack 11c are switched to first contacts S, and contact blades G of switches 17 electrically connected to the low-voltage battery packs 11a, 11b, and 11d are switched to second contacts D. In this way, the low-voltage battery pack 11*c* is disconnected from the other low-voltage battery packs, and the low-voltage battery packs 11*a*, 11*b*, and 11*d* are connected in series. Therefore, the faulty low-voltage battery pack 11*c* is isolated, and the normal low-voltage battery packs 11*a*, 11*b*, and 11*d* continue to supply power. As shown in FIG. 14A and FIG. 14B, contact blades G of switches 17 electrically connected to the low-voltage battery pack 11*d* are switched to first contacts S, and contact blades G of switches 17 electrically connected to the low-voltage battery packs 11*a*, 11*b*, and 11*c* are switched to second contacts D. In this way, the low-voltage battery pack 11*d* is disconnected from the other low-voltage battery packs, and the low-voltage battery packs 11*a*, 11*b*, and 11*c* are connected in series. Therefore, the faulty low-voltage battery pack 11*d* is isolated, and the normal low-voltage battery packs 11*a*, 11*b*, and 11*c* continue to supply power. The foregoing is described by using an example in which there are four low-voltage battery packs and one low-voltage battery pack is faulty. In an actual working process, when there are another quantity of low-voltage battery packs, and two, three, or more low-voltage battery packs are faulty, fault isolation may be performed based on a similar principle. Details are not described herein again.

In addition, after the faulty low-voltage battery pack is isolated, to enable the remaining low-voltage battery packs connected in series to still meet the power supply requirement, when the on-board distributed power supply system is designed, the total sum of the rated voltages of the low-voltage battery packs in the on-board distributed power supply system may be set to be greater than the electricity quantity required by the on-board distributed drive system, and an excess may be greater than or equal to a rated voltage of one or more low-voltage battery packs. For example, the total sum of the rated voltages of the low-voltage battery packs may be set to be greater than the electricity quantity required by the on-board distributed drive system by a rated voltage of one low-voltage battery pack. This may be set based on an actual case, and this is not limited herein.

During specific implementation, to improve charging efficiency, the low-voltage battery packs in the on-board distributed power supply system may be charged in series. Because the low-voltage battery packs supply power to different power trains, usage of electric energy of the low-voltage battery packs may be different. In this case, in a charging process, a low-voltage battery pack having a larger remaining electricity quantity is first fully charged. Because the low-voltage battery packs are connected in series, a charging current cannot pass through the low-voltage battery pack that is fully charged, and consequently charging of the other low-voltage battery packs is affected. In this embodiment of this application, a charging process of each low-voltage battery pack is monitored, and a connection status of each low-voltage battery pack is adjusted, so that each low-voltage battery pack can be normally charged. Specifically, the low-voltage battery packs are charged in series, and a remaining capacity of each low-voltage battery pack is detected. For example, a state of charge (state of charge, SOC) of each low-voltage battery pack may be detected to indicate the remaining capacity of each low-voltage battery pack. When it is detected that a first low-voltage battery pack whose remaining capacity reaches a specified threshold exists in the low-voltage battery packs, the first low-voltage battery pack is disconnected from low-voltage battery packs other than the first low-voltage battery pack, and the low-voltage battery packs other than the first low-voltage battery pack are charged in series. The specified threshold may be set to a value such as 80%, 90%, or 100%. This is not limited herein. With reference to the accompanying drawings, an example in which the on-board distributed power supply system includes four low-voltage battery packs is still used below to describe in detail the charging process of each low-voltage battery pack.

Figures 15A, 15B:
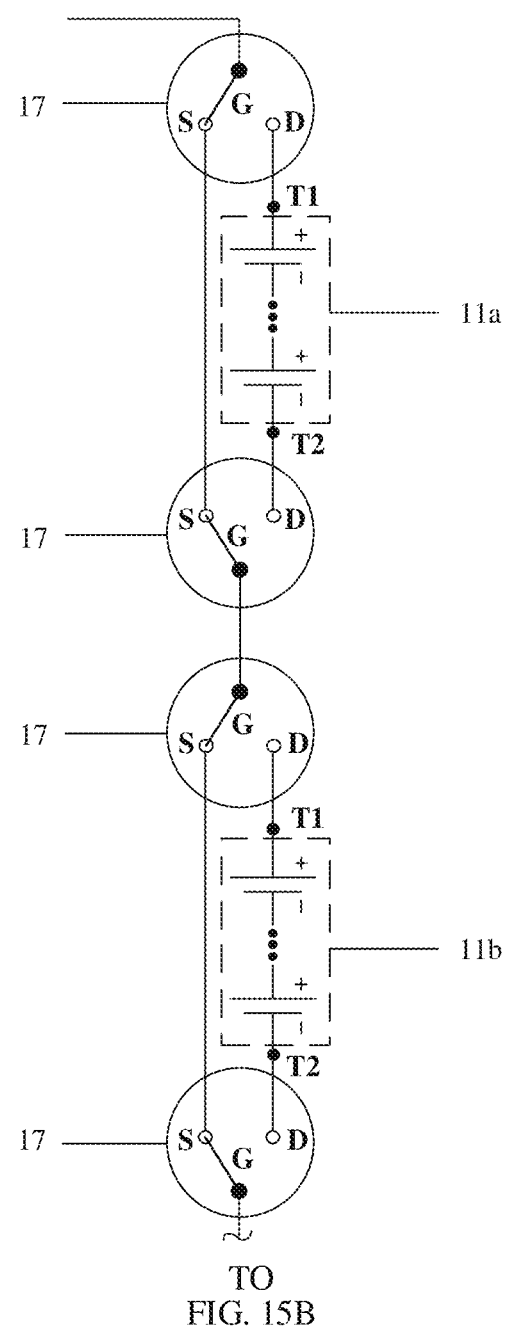
FIG. 15A and FIG. 15B are a schematic diagram of another connection relationship between low-voltage battery packs according to an embodiment of this application.
Figure 15B:
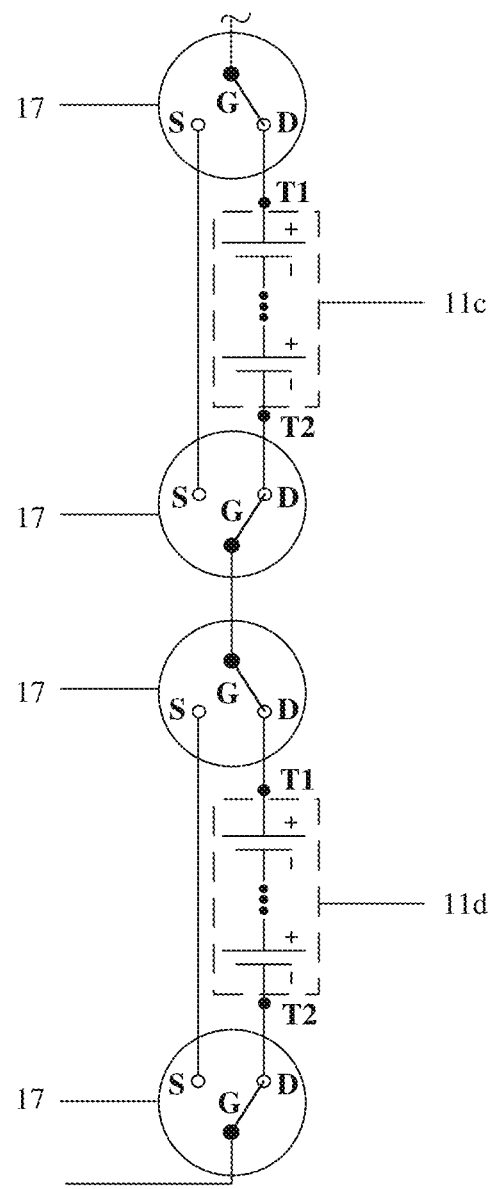
Figures 16A, 16B:
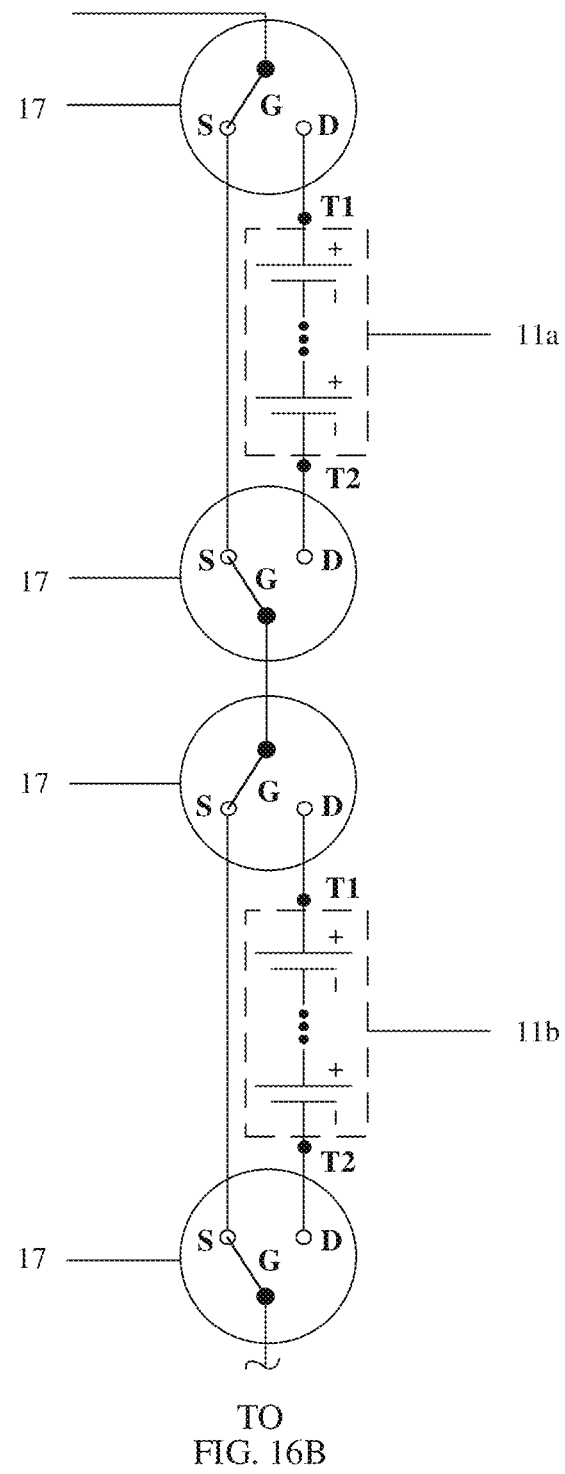
FIG. 16A and FIG. 16B are a schematic diagram of another connection relationship between low-voltage battery packs according to an embodiment of this application.
Figure 16B:
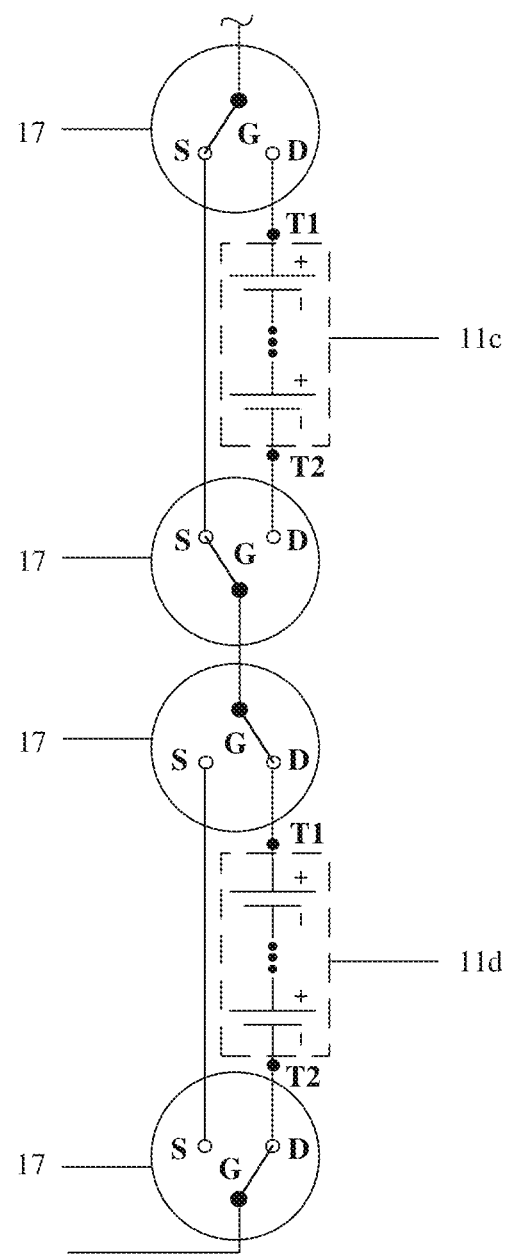

As shown in FIG. 10A and FIG. 10B, the contact blade G of each switch 17 is switched to the second contact D, so that the low-voltage battery packs 11*a*, 11*b*, 11*c*, and 11*d* are connected in series, and the low-voltage battery packs 11*a*, 11*b*, 11*c*, and 11*d* are charged in series. A remaining capacity of each low-voltage battery pack is detected in a charging process. As shown in FIG. 11A and FIG. 11B, when it is detected that a remaining capacity of the low-voltage battery pack 11*a* reaches the specified threshold, and remaining capacities of the low-voltage battery packs 11*b*, 11*c*, and 11*d* do not reach the specified threshold, the contact blades G of the switches 17 electrically connected to the low-voltage battery pack 11*a* are switched to the first contacts S, and the contact blades G of the switches 17 electrically connected to the low-voltage battery packs 11*b*, 11*c*, and 11*d* are switched to the second contacts D. In this way, the low-voltage battery pack 11*a* is disconnected from the other low-voltage battery packs, and the low-voltage battery packs 11*b*, 11*c*, and 11*d* are connected in series, so that the low-voltage battery packs 11*b*, 11*c*, and 11*d* continue to be charged. As shown in FIG. 15A and FIG. 15B, in a process of continuing charging, when it is detected that the remaining capacity of the low-voltage battery pack 11*b* reaches the specified threshold, and the remaining capacities of the low-voltage battery packs 11*c* and 11*d* do not reach the specified threshold, the contact blades G of the switches 17 electrically connected to the low-voltage battery pack 11*b* are also switched to the first contacts S, and the contact blades G of the switches 17 electrically connected to the low-voltage battery packs 11*c* and 11*d* are still switched to the second contacts D. In this way, the low-voltage battery packs 11*a* and 11*b* are disconnected from the other low-voltage battery packs, and the low-voltage battery packs 11*c* and 11*d* are connected in series, so that the low-voltage battery packs 11*c* and 11*d* continue to be charged. As shown in FIG. 16B, in a process of continuing charging, when it is detected that the remaining capacity of the low-voltage battery pack 11*c* reaches the specified threshold, and the remaining capacity of the low-voltage battery pack 11*d* does not reach the specified threshold, the contact blades G of the switches 17 electrically connected to the low-voltage battery pack 11*c* are also switched to the first contacts S, and the contact blades G of the switches 17 electrically connected to the low-voltage battery pack 11*d* are still switched to the second contacts D. In this way, the low-voltage battery packs 11*a*, 11*b*, and 11*c* are disconnected from the low-voltage battery pack 11*d*, so that the low-voltage battery pack 11*d* continues to be charged. A charging sequence from 11*a*, 11*b*, and 11*c* to 11*d* is used as an example for description above. In an actual charging process, the charging sequence may be determined based on a charging status of each low-voltage battery pack. This is not limited herein.

As shown in FIG. 7, the on-board distributed power supply system in this embodiment of this application may further include control switches 18. The low-voltage battery pack groups 10 are electrically connected to corresponding power trains 21 by using the control switches 18. The control switches 18 are disposed, so that the low-voltage battery pack groups 10 and the corresponding power trains 21 can be controlled to be connected or disconnected. The structure that is of the on-board distributed drive system and that is shown in FIG. 4*a* is used as an example. A front left wheel FL of the vehicle is connected to one power train 21, a front right wheel FR of the vehicle is connected to one power train 21, and a back left wheel BL and a back right wheel BR of the vehicle are connected to at least one power train 21 (in FIG. 4a, an example in which the back left wheel BL and the back right wheel BR are connected to two power trains 21 is used). When a low-voltage battery pack group 10 electrically connected to the power train 21 corresponding to the front left wheel FL of the vehicle and/or the power train 21 corresponding to the front right wheel FR of the vehicle is faulty, the power trains 21 corresponding to the front left wheel FL and the front right wheel FR are disconnected from the low-voltage battery pack group 10. In this way, it can be ensured that power supply of the electric vehicle is more balanced, and an abnormal phenomenon such as instability is prevented from occurring in the electric vehicle. In this case, the power train 21 connected to the back left wheel BL and the back right wheel BR can continue to drive the two rear wheels to roll, and drive, by using the two rear wheels, the two front wheels to roll, so that the electric vehicle can continue to travel. Similarly, the structure that is of the on-board distributed drive system and that is shown in FIG. 4a is still used as an example. A back left wheel BL of the vehicle is connected to one power train 21, a back right wheel BR of the vehicle is connected to one power train 21, and a front left wheel FL and a front right wheel FR of the vehicle are connected to at least one power train 21 (in FIG. 4a, an example in which the front left wheel FL and the front right wheel FR are connected to two power trains 21 is used). When a low-voltage battery pack group 10 electrically connected to the power train 21 corresponding to the back left wheel BL of the vehicle and/or the power train 21 corresponding to the back right wheel BR of the vehicle is faulty, the power trains 21 corresponding to the back left wheel BL and the back right wheel BR are disconnected from the low-voltage battery pack group 10.

An embodiment of this application further provides an on-board power supply control method, used to control an on-board distributed power supply system. The on-board power supply control method may be performed by an on-board power supply control apparatus, and the on-board power supply control apparatus may be a vehicle control unit (vehicle control unit, VCU) or a battery management system (battery management system, BMS). In addition, the on-board power supply control apparatus may be a control module or a control unit in the vehicle control unit (or the battery management system), and a specific type of the on-board power supply control apparatus is not limited herein.

Figure 17:
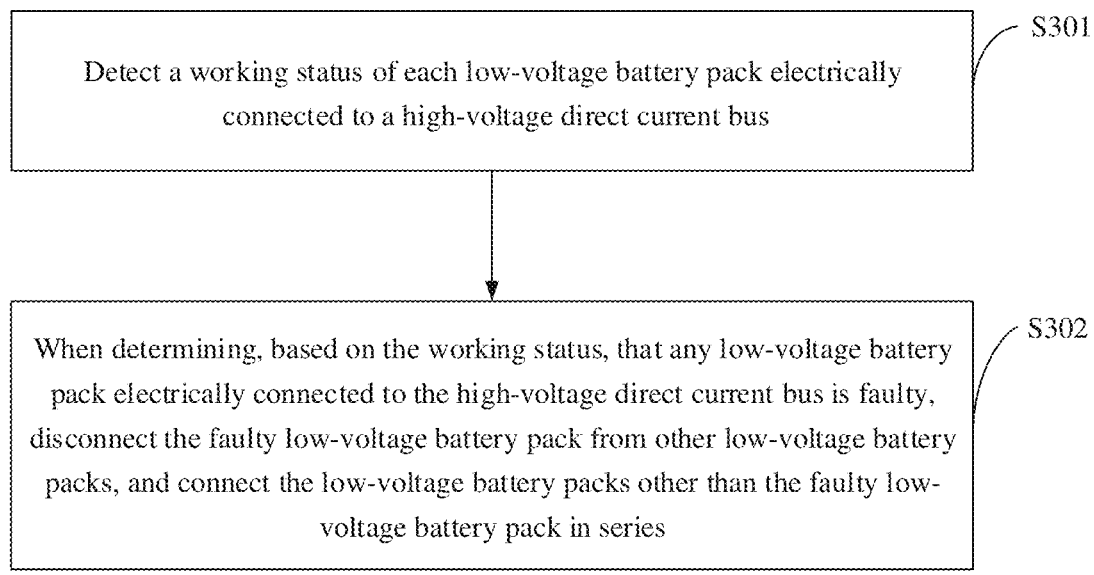
FIG. 17 is a flowchart of an on-board power supply control method according to an embodiment of this application.

As shown in FIG. 5, the on-board distributed power supply system includes at least two low-voltage battery pack groups 10 and a high-voltage direct current bus 12. Each low-voltage battery pack group 10 includes at least one low-voltage battery pack 11. Each low-voltage battery pack group 10 is correspondingly electrically connected to at least one power train 21 in an on-board distributed drive system to provide electric energy for each power train 21 in the on-board distributed drive system. At least two of the low-voltage battery packs 11 are connected in series, and are electrically connected to a high-voltage component 22 in a vehicle by using the high-voltage direct current bus 12. FIG. 17 is a flowchart of an on-board power supply control method according to an embodiment of this application. As shown in FIG. 17, the on-board power supply control method may include the following steps:

S301. Detect a working status of each low-voltage battery pack electrically connected to the high-voltage direct current bus.

S302. When determining, based on the working status, that any low-voltage battery pack electrically connected to the high-voltage direct current bus is faulty, disconnect the faulty low-voltage battery pack from other low-voltage battery packs, and connect the low-voltage battery packs other than the faulty low-voltage battery pack in series.

In the on-board power supply control method in this embodiment of this application, a faulty low-voltage battery pack may be isolated, so that normal low-voltage battery packs can continue to supply power. This further improves power supply reliability and safety of the on-board distributed power supply system, to meet a power supply requirement and a safety requirement in future intelligent driving.

As shown in FIG. 10A and FIG. 10B, the on-board distributed power supply system may further include a plurality of switches 17. The switches 17 each may include a contact blade G, a first contact S, and a second contact D. A first electrode T1 of each low-voltage battery pack 11 is electrically connected to a second contact D of one of the switches 17, and a second electrode T2 is electrically connected to a second contact D of another of the switches 17, and first contacts S of the two switches 17 connected to each low-voltage battery pack 11 are electrically connected. In two adjacent low-voltage battery packs 11 that are connected to each other, a contact blade G of a switch 17 connected to a first electrode T1 of one of the low-voltage battery packs 11 is electrically connected to a contact blade G of a switch 17 connected to a second electrode T2 of the other of the low-voltage battery packs 11.

In the on-board power supply control method provided in this embodiment of this application, step S302 may include the following:

Refer to FIG. 11A and FIG. 11B. Contact blades G of switches 17 electrically connected to the faulty low-voltage battery pack (for example, 11a is faulty) are switched to first contacts S, and contact blades G of switches 17 connected to the low-voltage battery packs 11b, 11c, and 11d other than the faulty low-voltage battery pack 11b are switched to second contacts D. In this way, the faulty low-voltage battery pack is disconnected from the other battery packs, and the normal low-voltage battery packs are connected in series. Therefore, the faulty low-voltage battery pack is isolated, and the normal low-voltage battery packs continue to supply power.

In some embodiments, the structure that is of the on-board distributed drive system and that is shown in FIG. 4a is used as an example. The on-board distributed power supply system may include at least three power trains 21. One of the power trains 21 is connected to a front left wheel FL of the vehicle, another of the power trains 21 is connected to a front right wheel FR of the vehicle, and remaining at least one of the power trains 21 is connected to a back left wheel BL and a back right wheel BR of the vehicle (in FIG. 4a, an example in which the back left wheel BL and the back right wheel BR are connected to two power trains 21 is used).

The on-board power supply control method provided in this embodiment of this application may further include the following: With reference to FIG. 4a and FIG. 7, when a low-voltage battery pack group 10 electrically connected to the power train 21 corresponding to the front left wheel FL of the vehicle and/or the power train 21 corresponding to the front right wheel FR of the vehicle is faulty, the power trains 21 corresponding to the front left wheel FL and the front right wheel FR are disconnected from the low-voltage battery pack group 10. In this way, it can be ensured that power supply of the electric vehicle is more balanced, and an abnormal phenomenon such as instability is prevented from occurring in the electric vehicle. In this case, the power train 21 connected to the back left wheel BL and the back right wheel BR can continue to drive the two rear wheels to roll, and drive, by using the two rear wheels, the two front wheels to roll, so that the electric vehicle can continue to travel. Specifically, control switches 18 may be used to control the low-voltage battery pack groups 10 and corresponding power trains 21 to be connected or disconnected.

Similarly, the structure that is of the on-board distributed drive system and that is shown in FIG. 4a is still used as an example. The on-board distributed power supply system may include at least three power trains 21. One of the power trains 21 is connected to a back left wheel BL of the vehicle, another of the power trains 21 is connected to a back right wheel BR of the vehicle, and remaining at least one of the power trains 21 is connected to a front left wheel FL and a front right wheel FR of the vehicle (in FIG. 4a, an example in which the front left wheel FL and the front right wheel FR are connected to two power trains 21 is used). The on-board power supply control method provided in this embodiment of this application may further include the following: When a low-voltage battery pack group 10 electrically connected to the power train 21 corresponding to the back left wheel BL of the vehicle and/or the power train 21 corresponding to the back right wheel BR of the vehicle is faulty, the power trains 21 corresponding to the back left wheel BL and the back right wheel BR are disconnected from the low-voltage battery pack group 10.

In this embodiment of this application, the on-board power supply control method may further include the following:

controlling the at least two low-voltage battery pack groups to be charged in series, and obtaining a remaining capacity of each low-voltage battery pack;

when determining that there is a first low-voltage battery pack whose remaining capacity reaches a specified threshold in all the low-voltage battery packs, disconnecting the first low-voltage battery pack from low-voltage battery packs other than the first low-voltage battery pack; and controlling the low-voltage battery packs other than the first low-voltage battery pack to be charged in series.

For example, as shown in FIG. 11A and FIG. 11B, when it is detected that a remaining capacity of the low-voltage battery pack 11a reaches the specified threshold, and remaining capacities of the other low-voltage battery packs 11b, 11c, and 11d do not reach the specified threshold, the contact blades G of the switches 17 electrically connected to the low-voltage battery pack 11a are switched to the first contacts S, and the contact blades G of the switches 17 electrically connected to the low-voltage battery packs 11b, 11c, and 11d are switched to the second contacts D. In this way, the low-voltage battery pack 11a is disconnected from the other low-voltage battery packs, and the low-voltage battery packs 11b, 11c, and 11d are connected in series, so that the low-voltage battery packs 11b, 11c, and 11d continue to be charged. In this embodiment of this application, a charging process of each low-voltage battery pack is monitored, and a connection status of each low-voltage battery pack is adjusted, so that each low-voltage battery pack can be normally charged.

In addition, as shown in FIG. 5, the on-board distributed power supply system further includes at least two direct current to direct current converters 13 and a low-voltage bus 14. The direct current to direct current converters 13 are connected in parallel, and are electrically connected to the high-voltage direct current bus 12. The direct current to direct current converter 13 is electrically connected to a low-voltage component 23 in the vehicle through the low-voltage bus 14.

In this embodiment of this application, the on-board power supply control method may further include the following:

Refer to FIG. 5. The direct current to direct current converters 13 are controlled to work simultaneously, and when it is determined that a first direct current to direct current converter in all the direct current to direct current converters 13 is faulty, output power of direct current to direct current converters 13 other than the first direct current to direct current converter is increased; or one direct current to direct current converter 13 in all the direct current to direct current converters 13 is controlled to work, and remaining direct current to direct current converters 13 are controlled to be in a standby state (the converters are powered on but do not output power); and when it is detected that the direct current to direct current converter 13 in a working state is faulty, one of the direct current to direct current converters 13 other than the faulty direct current to direct current converter 13 is controlled to output power.

In this way, it can be ensured that electric energy is continuously supplied to the low-voltage component 23, to prevent the electric vehicle from being out of control or incapable of traveling because electric energy fails to be supplied to the low-voltage component 23. This improves power supply reliability of the low-voltage component 23.

An embodiment of this application further provides an on-board power supply control apparatus, where the on-board power supply control apparatus is configured to perform the on-board power supply control method. Optionally, the on-board power supply control apparatus may be a vehicle control unit (vehicle control unit, VCU) or a battery management system (battery management system, BMS). In addition, the on-board power supply control apparatus may be a control module or a control unit in the vehicle control unit (or the battery management system). Certainly, the on-board power supply control apparatus may be another apparatus that may perform the on-board power supply control method. This is not limited herein.

In this embodiment of this application, the vehicle control unit is a core component of an electric vehicle, and the vehicle control unit is electrically connected to components such as a battery management system, a motor control unit, a charging system, and a braking system in the electric vehicle, to perform integrated and coordinated control. Optionally, the vehicle control unit may include a master control chip, a clock circuit, a reset circuit, a power supply module, a signal processing circuit, and a communications interface circuit. During specific implementation, the on-board power supply control method may be performed by using the master control chip.

In this embodiment of this application, the battery management system may be electrically connected to the on-board distributed power supply system, to manage the low-voltage battery pack in the on-board distributed power supply system. Optionally, the battery management system may include a battery monitoring unit and a battery control unit. The battery monitoring unit may monitor parameters such as a voltage, a current, a temperature, and a state of charge of the low-voltage battery pack. The battery control unit may control the low-voltage battery pack based on the detected parameters, to prevent an abnormal phenomenon such as overdischarge, overcharge, and overtemperature from occurring in a battery. During specific implementation, the on-board power supply control method may be performed by using the battery control unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An on-board distributed power supply system, coupled to an on-board distributed drive system, wherein the on-board distributed drive system comprises at least two power trains, and the on-board distributed power supply system comprises at least two low-voltage battery pack groups and a plurality of switches;
    wherein each low-voltage battery pack group of the at least two low-voltage battery pack groups comprises at least one low-voltage battery pack, and each low-voltage battery pack of the at least one low-voltage battery pack comprises a plurality of battery cells; and
    each low-voltage battery pack group of the at least two low-voltage battery pack groups is correspondingly electrically connected to at least one of the power trains in the on-board distributed drive system, and is configured to provide electric energy for each power train of the at least two power trains in the on-board distributed drive system;
    wherein each switch of the plurality of switches comprises a contact blade, a first contact, and a second contact;
    a first electrode of each low-voltage battery pack of the at least one low-voltage battery pack is electrically connected to a second contact of a first switch of the plurality of switches, and a second electrode of each low-voltage battery pack of the at least one low-voltage battery pack is electrically connected to a second contact of a second switch of the plurality of switches, and the first contact of the first switch and the second switch are electrically connected to each low-voltage battery pack of the at least one low-voltage battery pack; and
    in two adjacent low-voltage battery packs of the at least one low-voltage battery pack that are connected to each other, a contact blade of a third switch of the plurality of switches connected to a first electrode of a first low-voltage battery pack of the two adjacent low-voltage battery packs of the at least one low-voltage battery pack is electrically connected to a contact blade of a fourth switch of the plurality of switches connected to a second electrode of a second low-voltage battery pack of the two adjacent low-voltage battery packs of the at least one low-voltage battery pack.

2. The on-board distributed power supply system according to claim 1, wherein each low-voltage battery pack group of the at least two low-voltage battery pack groups comprises one low-voltage battery pack or at least two low-voltage battery packs connected together in series.

3. The on-board distributed power supply system according to claim 1, wherein
    the at least two low-voltage battery pack groups in the on-board distributed power supply system are electrically connected to the at least two power trains in the on-board distributed drive system in a one-to-one correspondence manner; or
    each low-voltage battery pack group of the at least two low-voltage battery pack groups in the on-board distributed power supply system is electrically connected to the at least two power trains in parallel.

4. The on-board distributed power supply system according to claim 1, further comprising a high-voltage direct current bus, wherein
    at least two of the low-voltage battery packs in the at least two low-voltage battery pack groups are connected in series, and are electrically connected to a high-voltage component in a vehicle by the high-voltage direct current bus.

5. The on-board distributed power supply system according to claim 4, further comprising at least two direct current to direct current converters and a low-voltage bus, wherein
    the at least two direct current to direct current converters are connected in parallel, and are electrically connected to the high-voltage direct current bus; and
    the direct current to direct current converter is electrically connected to a low-voltage component in the vehicle through the low-voltage bus.

6. The on-board distributed power supply system according to claim 5, further comprising at least two low-voltage batteries, wherein
    the at least two low-voltage batteries are electrically connected to the direct current to direct current converter.

7. The on-board distributed power supply system according to claim 1, further comprising control switches, wherein
    the at least two low-voltage battery pack groups are electrically connected to the at least two corresponding power trains by the control switches.

8. A method to control an on-board distributed power supply system, wherein the on-board distributed power supply system comprises at least two low-voltage battery pack groups and a high-voltage direct current bus, each low-voltage battery pack group of the at least two low-voltage battery pack groups comprises at least one low-voltage battery pack, each low-voltage battery pack group of the at least two low-voltage battery pack groups is correspondingly electrically connected to at least one power train in the on-board distributed drive system, and is configured to provide electric energy for each power train of the at least one power train in the on-board distributed drive system, and at least two low-voltage battery packs of the at least two low-voltage battery pack groups are connected in series, and are electrically connected to a high-voltage component in a vehicle by the high-voltage direct current bus; and
    wherein the method to control the on-board distributed power supply system comprises:
    detecting a working status of each low-voltage battery pack of the at least two low-voltage battery pack groups electrically connected to the high-voltage direct current bus; and
    disconnecting a faulty low-voltage battery pack of the at least one low-voltage battery pack from other low-voltage battery packs of the at least one low-voltage battery pack, and connecting the other low-voltage battery packs of the at least one low-voltage battery pack in series in response to determining that at least one low-voltage battery pack electrically connected to the high-voltage direct current bus is faulty based on the working status;

wherein the on-board distributed power supply system further comprises a plurality of switches; each switch of the plurality of switches comprises a contact blade, a first contact, and a second contact; wherein a first electrode of each low-voltage battery pack of the at least one low-voltage battery pack is electrically connected to a second contact of a first switch of the plurality of switches, and a second electrode of each low-voltage battery pack of the at least one low-voltage battery pack is electrically connected to a second contact of a second switch of the plurality of switches, and the first contact of the first switch and the second switch are electrically connected to each low-voltage battery pack of the at least one low-voltage battery pack; and in two adjacent low-voltage battery packs of the at least one low-voltage battery pack that are connected to each other, a contact blade of a third switch of the plurality of switches connected to a first electrode of a first low-voltage battery pack of the two adjacent low-voltage battery packs of the at least one low-voltage battery pack is electrically connected to a contact blade of a fourth switch of the plurality of switches connected to a second electrode of a second low-voltage battery pack of the two adjacent low-voltage battery packs of the at least one low-voltage battery pack; and wherein the disconnecting the faulty low-voltage battery pack of the at least one low-voltage battery pack from other low-voltage battery packs of the at least one low-voltage battery pack, and connecting the other low-voltage battery packs of the at least one low-voltage battery pack in series comprises:

switching each contact blade of each corresponding switch of the plurality of switches that are electrically connected to the faulty low-voltage battery pack to the corresponding first contacts; and switching each contact blade of each corresponding switch of the plurality of switches that are connected to the other low-voltage battery packs to the corresponding second contacts.

9. The method to control the on-board distributed power supply system according to claim 8, wherein the on-board distributed power supply system comprises at least three power trains, a first power train of the at least three power trains is connected to a front left wheel of the vehicle, a second power train of the at least three power trains is connected to a front right wheel of the vehicle, and a third power train of the at least three power trains is connected to at least a back left wheel or a back right wheel of the vehicle; and the method to control the on-board distributed power supply system further comprises:

disconnecting the first power train or the second power train from a corresponding low-voltage battery pack group in response to the low-voltage battery pack group of the at least two low-voltage battery pack groups being electrically connected to at least one of the first power train or the second power train being faulty.

10. The method to control the on-board distributed power supply system according to claim 8, wherein the on-board distributed power supply system comprises at least three power trains, a first power train of the at least three power trains is connected to a back left wheel of the vehicle, a second power train of the at least three power trains is connected to a back right wheel of the vehicle, and a third power train of the at least three power trains is connected to at least a front left wheel or a front right wheel of the vehicle; and the method to control the on-board distributed power supply system further comprises:

disconnecting the first power train or the second power train from a corresponding low-voltage battery pack group in response to the low-voltage battery pack group of the at least two low-voltage battery pack groups being electrically connected to at least one of the first power train or the second power train being faulty.

11. The method to control the on-board distributed power supply system according to claim 8, further comprising:

controlling the low-voltage battery packs in the at least two low-voltage battery pack groups to be charged in series, and obtaining a remaining capacity of each low-voltage battery pack in the at least two low-voltage battery pack groups;

disconnecting a first low-voltage battery pack from other low-voltage battery packs of the at least two low-voltage battery pack groups in response to determining that the first low-voltage battery pack has a remaining capacity that is at least equal to a threshold in the at least two low-voltage battery pack groups; and controlling the other low-voltage battery packs to be charged in series.

12. The method to control the on-board distributed power supply system according to claim 8, wherein the on-board distributed power supply system further comprises at least two direct current to direct current converters and a low-voltage bus; the direct current to direct current converters are connected in parallel, and are electrically connected to the high-voltage direct current bus; and the direct current to direct current converter is electrically connected to a low-voltage component in the vehicle through the low-voltage bus; and the method to control the on-board distributed power supply system further comprises:

controlling the at least two direct current to direct current converters to operate simultaneously, and increasing output power of other direct current to direct current converters of the at least two direct current to direct current converters and in response to determining that a first direct current to direct current converter in the at least two direct current to direct current converters is faulty; or controlling a first direct current to direct current converter in the at least two direct current to direct current converters to operate, and controlling remaining direct current to direct current converters in the at least two direct current to direct current converters to be in a standby state; and controlling at least one of the remaining direct current to direct current converters in the at least two direct current to direct current converters to output power in response to determining that the first direct current to direct current converter is faulty.

13. An on-board power supply control apparatus, wherein the on-board power supply control apparatus is connected to an on-board distributed power supply system; the on-board distributed power supply system comprises at least two low-voltage battery pack groups and a high-voltage direct current bus;

each low-voltage battery pack group of the at least two low-voltage battery pack groups comprises at least one low-voltage battery pack;

each low-voltage battery pack group of the at least two low-voltage battery pack groups is correspondingly electrically connected to at least one power train in the on-board distributed drive system, and is configured to provide electric energy for each power train of the at least one power train in the on-board distributed drive system; and at least two low-voltage battery packs of the at least two low-voltage battery pack groups are connected in series, and are electrically connected to a high-voltage component in a vehicle by the high-voltage direct current bus; and wherein the on-board power supply control apparatus is configured to:

detect a working status of each low-voltage battery pack of the at least two low-voltage battery pack groups electrically connected to the high-voltage direct current bus; and disconnecting a faulty low-voltage battery pack of the at least one low-voltage battery pack from other low-voltage battery packs of the at least one low-voltage battery pack, and connecting the other low-voltage battery packs of the at least one low-voltage battery pack in series in response to determining that at least one low-voltage battery pack electrically connected to the high-voltage direct current bus is faulty based on the working status;

wherein the on-board distributed power supply system further comprises:

a plurality of switches; each switch of the plurality of switches comprises a contact blade, a first contact, and a second contact; wherein a first electrode of each low-voltage battery pack of the at least one low-voltage battery pack is electrically connected to a second contact of a first switch of the plurality of switches, and a second electrode of each low-voltage battery pack of the at least one low-voltage battery pack is electrically connected to a second contact of a second switch of the plurality of switches, and the first contact of the first switch and the second switch are electrically connected to each low-voltage battery pack of the at least one low-voltage battery pack; and in two adjacent low-voltage battery packs of the at least one low-voltage battery pack that are connected to each other, a contact blade of a third switch of the plurality of switches connected to a first electrode of a first low-voltage battery pack of the two adjacent low-voltage battery packs of the at least one low-voltage battery pack is electrically connected to a contact blade of a fourth switch of the plurality of switches connected to a second electrode of a second low-voltage battery pack of the two adjacent low-voltage battery packs of the at least one low-voltage battery pack; and wherein the disconnecting the faulty low-voltage battery pack of the at least one low-voltage battery pack from other low-voltage battery packs of the at least one low-voltage battery pack, and connecting the other low-voltage battery packs of the at least one low-voltage battery pack in series comprises:

switching each contact blade of each corresponding switch of the plurality of switches that are electrically connected to the faulty low-voltage battery pack to the corresponding first contacts; and switching each contact blade of each corresponding switch of the plurality of switches that are switching each contact blade of each corresponding switch of the plurality of switches that are connected to the other low-voltage battery packs to the corresponding second contacts.

14. The on-board power supply control apparatus according to claim 13, wherein the on-board distributed power supply system comprises at least three power trains, a first power train of the at least three power trains is connected to a front left wheel of the vehicle, a second power train of the at least three power trains is connected to a front right wheel of the vehicle, and a third power train of the at least three power trains is connected to at least a back left wheel or a back right wheel of the vehicle; and wherein the on-board power supply control apparatus is further configured to:

disconnecting the first power train or the second power train from a corresponding low-voltage battery pack group in response to the low-voltage battery pack group of the at least two low-voltage battery pack groups being electrically connected to at least one of the first power train or the second power train being faulty.

* * * * *